United States Patent
Butler

(10) Patent No.: US 12,485,528 B2
(45) Date of Patent: Dec. 2, 2025

(54) MOBILE KIOSK SERVICE ROBOT AND BASE ASSEMBLY FOR SAME

(71) Applicant: Aristocrat Technologies, Inc., Las Vegas, NV (US)

(72) Inventor: Robert Brett Butler, Austin, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 395 days.

(21) Appl. No.: 17/936,806

(22) Filed: Sep. 29, 2022

(65) Prior Publication Data

US 2024/0109178 A1  Apr. 4, 2024

(51) Int. Cl.
| | | |
|---|---|---|
| *B25J 9/00* | (2006.01) | |
| *B25J 5/00* | (2006.01) | |
| *B25J 11/00* | (2006.01) | |
| *G05D 1/00* | (2006.01) | |
| *G06F 3/0488* | (2022.01) | |

(52) U.S. Cl.
CPC ............. *B25J 9/0009* (2013.01); *B25J 5/007* (2013.01); *B25J 11/008* (2013.01); *G05D 1/0238* (2013.01); *G05D 1/0255* (2013.01); *G06F 3/0488* (2013.01)

(58) Field of Classification Search
CPC ........ B25J 9/0009; B25J 5/007; B25J 11/008; G05D 1/0238; G05D 1/0255; G06F 3/0488; G07F 17/3202; G07F 17/3209; G07F 17/3218
See application file for complete search history.

(56) References Cited

U.S. PATENT DOCUMENTS 4,171,730 A * 10/1979 Dow .................... B62D 31/003
296/35.3
4,934,733 A *  6/1990 Smith .................... B60G 3/207
280/124.132

(Continued)

FOREIGN PATENT DOCUMENTS

| CN | 101548300 A | 9/2009 |
|---|---|---|
| JP | 2006034823 A | 2/2006 |

OTHER PUBLICATIONS

Office Action (Non-Final Rejection) dated Nov. 3, 2021 for U.S. Appl. No. 17/212,780 (pp. 1-19).

(Continued)

*Primary Examiner* — Sihar A Karwan
(74) *Attorney, Agent, or Firm* — Weaver Austin Villeneuve & Sampson LLP

(57) ABSTRACT

A kiosk service robot may include a base unit, a superstructure, and a first display. The base unit may include two drive wheels disposed on a first side of the base unit, each being independently drivable. The two drive wheels may be arranged such that the two drive wheels have a track between 14" and 18". The base unit may also include a plurality of casters disposed on the first side of the base unit. The plurality of casters may be arranged such that each caster of the plurality of casters are radially offset from a track center of the plurality of casters by a distance between 7" and 9". The base unit may further include a housing sized so as to be circumscribed by a cylindrical reference volume having a diameter of between 16" and 24" and configured to provide an exterior surface of the base unit.

20 Claims, 15 Drawing Sheets

(56) References Cited

U.S. PATENT DOCUMENTS

| | | | | |
|---|---|---|---|---|
| 5,004,257 A | * | 4/1991 | MacIsaac | B60G 21/00 |
| | | | | 280/5.513 |
| 5,016,912 A | * | 5/1991 | Smith | B60G 11/27 |
| | | | | 280/124.132 |
| 5,058,916 A | * | 10/1991 | Hicks | B62D 61/12 |
| | | | | 180/209 |
| D351,866 S | | 10/1994 | Freels | |
| D378,224 S | | 2/1997 | Brettschneider | |
| D383,802 S | | 9/1997 | Levy | |
| D404,436 S | | 1/1999 | McGahn | |
| D411,257 S | | 6/1999 | Nolte | |
| 6,042,138 A | * | 3/2000 | Shreck | B62K 27/06 |
| | | | | 280/492 |
| 6,056,077 A | * | 5/2000 | Kobayashi | B62K 5/007 |
| | | | | 280/786 |
| D428,063 S | | 7/2000 | Thomas | |
| D450,310 S | | 11/2001 | Hedrick | |
| D473,899 S | | 4/2003 | Munoz | |
| D492,734 S | | 7/2004 | Karstens | |
| 7,222,000 B2 | | 5/2007 | Wang | |
| D563,481 S | | 3/2008 | Looks | |
| D587,319 S | | 2/2009 | Moises Deiab | |
| D592,709 S | | 5/2009 | McComb | |
| D612,432 S | | 3/2010 | De Viveiros Ortiz | |
| D631,635 S | | 1/2011 | Tuli | |
| 8,676,893 B1 | | 3/2014 | Teller | |
| 8,886,383 B2 | | 11/2014 | Hyde | |
| 8,994,591 B2 | | 3/2015 | Dupray | |
| D762,613 S | | 8/2016 | Garneau | |
| 9,411,337 B1 | | 8/2016 | Theobald | |
| 9,489,490 B1 | * | 11/2016 | Theobald | G16H 20/13 |
| D774,029 S | | 12/2016 | Kim | |
| 9,534,906 B2 | * | 1/2017 | High | G01S 1/02 |
| 9,535,421 B1 | | 1/2017 | Canoso | |
| 9,649,766 B2 | | 5/2017 | Stubbs | |
| 9,720,414 B1 | * | 8/2017 | Theobald | B25J 5/007 |
| 9,919,420 B1 | | 3/2018 | Theobald | |
| D816,078 S | | 4/2018 | Horn | |
| 10,044,464 B1 | | 8/2018 | Bostick | |
| 10,328,836 B2 | * | 6/2019 | Purwin | B25J 5/007 |
| D872,768 S | | 1/2020 | Morisawa | |
| D885,378 S | | 5/2020 | Kochubievsky | |
| 10,737,377 B2 | | 8/2020 | Fulop | |
| 10,755,522 B1 | | 8/2020 | Pechinko | |
| 10,786,033 B2 | | 9/2020 | Brown | |
| 10,835,810 B2 | | 11/2020 | Doptis | |
| 11,046,562 B2 | * | 6/2021 | High | G06Q 30/016 |
| D928,875 S | | 8/2021 | Yang | |
| 11,090,811 B2 | * | 8/2021 | Beach | B25J 9/1697 |
| 11,099,562 B1 | | 8/2021 | Ebrahimi Afrouzi | |
| 11,209,832 B2 | | 12/2021 | Deyle | |
| 11,209,887 B1 | | 12/2021 | Jung | |
| 11,425,494 B1 | * | 8/2022 | Chatlani | G06F 3/16 |
| D962,958 S | | 9/2022 | Collins | |
| 11,532,205 B2 | | 12/2022 | Cupersmith | |
| 11,548,159 B1 | * | 1/2023 | Ebrahimi Afrouzi | G06T 7/13 |
| 2006/0009285 A1 | | 1/2006 | Pryzby | |
| 2006/0045679 A1 | * | 3/2006 | Ostendorff | G05D 1/0225 |
| | | | | 414/402 |
| 2007/0192910 A1 | | 8/2007 | Vu | |
| 2007/0194170 A1 | * | 8/2007 | Ellison | H04N 23/11 |
| | | | | 244/3.1 |
| 2007/0198129 A1 | | 8/2007 | Koselka | |
| 2008/0108424 A1 | | 5/2008 | Baerlocher | |
| 2009/0106653 A1 | | 4/2009 | Lee | |
| 2010/0145512 A1 | | 6/2010 | Flessas | |
| 2011/0054686 A1 | | 3/2011 | Lee | |
| 2013/0129086 A1 | * | 5/2013 | Tang | G06Q 20/1235 |
| | | | | 380/44 |
| 2013/0204993 A1 | | 8/2013 | Uribe-Etxebarria Jimenez | |
| 2013/0331976 A1 | | 12/2013 | Freeman | |
| 2013/0338525 A1 | | 12/2013 | Allen | |
| 2013/0339146 A1 | * | 12/2013 | Goldberg | G06Q 30/0212 |
| | | | | 705/14.53 |
| 2014/0207282 A1 | | 7/2014 | Angle | |
| 2014/0214556 A1 | | 7/2014 | Willett | |
| 2014/0277847 A1 | * | 9/2014 | Cann | B60L 50/51 |
| | | | | 701/2 |
| 2014/0279733 A1 | * | 9/2014 | Djugash | B25J 19/023 |
| | | | | 901/46 |
| 2015/0042619 A1 | * | 2/2015 | Forti | G06F 3/042 |
| | | | | 345/175 |
| 2015/0080096 A1 | * | 3/2015 | Saunders | G07F 17/3225 |
| | | | | 463/20 |
| 2015/0139766 A1 | * | 5/2015 | Cousins | B25J 9/1679 |
| | | | | 414/812 |
| 2015/0158182 A1 | | 6/2015 | Farlow | |
| 2015/0190927 A1 | | 7/2015 | Sutherland | |
| 2015/0205298 A1 | | 7/2015 | Stoschek | |
| 2015/0350569 A1 | * | 12/2015 | Espersen | G03B 15/006 |
| | | | | 348/164 |
| 2016/0328569 A1 | * | 11/2016 | Lee | H04L 63/10 |
| 2016/0328730 A1 | | 11/2016 | Salamon | |
| 2016/0379256 A1 | | 12/2016 | Salamon | |
| 2017/0136631 A1 | | 5/2017 | Li | |
| 2017/0147322 A1 | | 5/2017 | Vopni | |
| 2017/0148276 A1 | | 5/2017 | Russell | |
| 2017/0213268 A1 | * | 7/2017 | Puehse | G10L 13/00 |
| 2017/0225336 A1 | * | 8/2017 | Deyle | B25J 11/008 |
| 2018/0001481 A1 | * | 1/2018 | Shah | B25J 11/008 |
| 2018/0221240 A1 | * | 8/2018 | Yu | G05D 1/0238 |
| 2018/0240304 A1 | | 8/2018 | Blatstein | |
| 2018/0268468 A1 | | 9/2018 | Levy | |
| 2018/0284786 A1 | * | 10/2018 | Moshkina-Martinson | A47L 9/2852 |
| 2018/0299899 A1 | * | 10/2018 | Suvarna | A47L 9/2805 |
| 2018/0322268 A1 | | 11/2018 | Grammer | |
| 2019/0005545 A1 | * | 1/2019 | Roh | G06Q 30/0266 |
| 2019/0033869 A1 | * | 1/2019 | Herron | A47L 11/03 |
| 2019/0033883 A1 | | 1/2019 | Ferguson | |
| 2019/0049995 A1 | | 2/2019 | Ferguson | |
| 2019/0061157 A1 | | 2/2019 | Suvarna | |
| 2019/0099681 A1 | | 4/2019 | Rico | |
| 2019/0102667 A1 | | 4/2019 | Bashkirov | |
| 2019/0129445 A1 | | 5/2019 | Koo | |
| 2019/0180236 A1 | | 6/2019 | Greenberger | |
| 2019/0208034 A1 | | 7/2019 | Shribman | |
| 2019/0248002 A1 | * | 8/2019 | Deyle | B25J 19/023 |
| 2019/0248013 A1 | * | 8/2019 | Deyle | B25J 13/006 |
| 2019/0248014 A1 | * | 8/2019 | Deyle | B25J 13/006 |
| 2019/0248016 A1 | * | 8/2019 | Deyle | B25J 13/006 |
| 2019/0306230 A1 | | 10/2019 | Purushothaman | |
| 2019/0360258 A1 | | 11/2019 | Uemizo | |
| 2019/0375093 A1 | * | 12/2019 | Kim | B64F 1/368 |
| 2019/0375094 A1 | * | 12/2019 | Kim | B25J 11/008 |
| 2019/0375102 A1 | | 12/2019 | Wang | |
| 2019/0377349 A1 | | 12/2019 | Van Der Merwe | |
| 2019/0381671 A1 | * | 12/2019 | Yeo | B25J 13/06 |
| 2020/0020204 A1 | | 1/2020 | Acres | |
| 2020/0023513 A1 | * | 1/2020 | Ha | B25J 19/0054 |
| 2020/0037522 A1 | * | 2/2020 | DeJarnette | A01G 27/003 |
| 2020/0050206 A1 | | 2/2020 | Deyle | |
| 2020/0156256 A1 | * | 5/2020 | Park | B25J 11/008 |
| 2020/0184278 A1 | | 6/2020 | Zadeh | |
| 2020/0184542 A1 | * | 6/2020 | Welty | G06Q 30/0224 |
| 2020/0218254 A1 | | 7/2020 | Sohn | |
| 2020/0283229 A1 | * | 9/2020 | Edwards | G05D 1/0297 |
| 2020/0290210 A1 | | 9/2020 | Ha | |
| 2020/0406470 A1 | * | 12/2020 | Herold | B25J 11/008 |
| 2021/0018912 A1 | | 1/2021 | Dymesich | |
| 2021/0046650 A1 | | 2/2021 | Deyle | |
| 2021/0081917 A1 | | 3/2021 | Blackford | |
| 2021/0118001 A1 | | 4/2021 | Bloy | |
| 2021/0154850 A1 | | 5/2021 | Sutherland | |
| 2021/0256472 A1 | | 8/2021 | Ali | |
| 2021/0304052 A1 | | 9/2021 | Pant | |
| 2021/0304556 A1 | | 9/2021 | Cupersmith | |
| 2021/0331315 A1 | | 10/2021 | Park | |
| 2021/0362335 A1 | | 11/2021 | Kim | |
| 2022/0004979 A1 | | 1/2022 | Melanson | |
| 2022/0017121 A1 | * | 1/2022 | McLean | B60W 50/14 |

(56) References Cited

U.S. PATENT DOCUMENTS

| | | |
|---|---|---|
| 2022/0083058 A1 | 3/2022 | Passot |
| 2023/0014881 A1 | 1/2023 | O'Hara |
| 2023/0209127 A1 | 6/2023 | Sawyer |

OTHER PUBLICATIONS

Office Action (Non-Final Rejection) dated Dec. 8, 2022 for U.S. Appl. No. 17/212,617 (pp. 1-26).
Office Action (Final Rejection) dated Apr. 20, 2022 for U.S. Appl. No. 17/212,780 (pp. 1-19).
Office Action (Notice of Allowance and Fees Due (PTOL-85)) dated Aug. 17, 2022 for U.S. Appl. No. 17/212,780 (pp. 1-9).
Office Action (Non-Final Rejection) dated Feb. 9, 2023 for U.S. Appl. No. 17/212,853 (pp. 1-13).
Office Action (Non-Final Rejection) dated Feb. 16, 2023 for U.S. Appl. No. 17/212,762 (pp. 1-10).
Office Action (Non-Final Rejection) dated Aug. 8, 2023 for U.S. Appl. No. 18/058,643 (pp. 1-38).
Office Action (Non-Final Rejection) dated Jun. 26, 2023 for U.S. Appl. No. 17/212,744 (pp. 1-5).
Office Action (Notice of Allowance and Fees Due (PTOL-85)) dated Jun. 1, 2023 for U.S. Appl. No. 17/212,853 (pp. 1-9).
Office Action (Final Rejection) dated Jun. 9, 2023 for U.S. Appl. No. 17/212,617 (pp. 1-31).
HeB et al., Remote controlling of technical systems using mobile devices, 2009, IEEE, p. 625-628 (Year: 2009).
Chivarov et al., Multi-channel software infrastructure for remote control of service robots, 2019, IEEE, p. 12583-1288 (Year: 2019).
Bosch et al., Toward Evidence-Based Organizations: Lessons from Embedded Systems, Online Games, and the Internet of Things, 2017, IEEE, p. 60-66 (Year: 2017).
Amini et al., A Large-Scale Infrastructure for Serious Games Services, 2018, IEEE, p. 27-33 (Year: 2018).
Supriyanto et al., Gamification to Improve Digital Data Collection in Ecotourism Management, 2018, IEEE, p. 139-142 (Year: 2018).
Hu et al., A Mobile Game to Collect and Improve Position of Images, 2009, IEEE, p. 70-73 (Year: 2009).
Ward et al., Gaming network delays investigation and collection of very large-scale data sets, 2017, IEEE, p. 1-7 (Year: 2017).
Schatten et al., A Social Network Analysis of a Massively Multiplayer On-Line Role Playing Game, 2015, IEEE, p. 37-42 (Year: 2015).
Office Action (Non-Final Rejection) dated Jun. 12, 2023 for U.S. Appl. No. 17/212,658 (pp. 1-21).
Office Action (Non-Final Rejection) dated Jun. 28, 2023 for U.S. Appl. No. 17/212,801 (pp. 1-10).
Notice of Allowance dated Jul. 5, 2023 for U.S. Appl. No. 17/212,762 (pp. 1-12).
Office Action (Notice of Allowance and Fees Due (PTOL-85)) dated Jul. 5, 2023 for U.S. Appl. No. 17/212,762 (pp. 1-11).
Office Action (Notice of Allowance and Fees Due (PTOL-85)) dated Sep. 22, 2023 for U.S. Appl. No. 17/212,744 (pp. 1-7).
Office Action (Non-Final Rejection) dated Sep. 21, 2023 for U.S. Appl. No. 17/212,902 (pp. 1-11).
Notice of Allowance dated Mar. 8, 2023 for U.S. Appl. No. 29/752,251 (pp. 1-7).
Notice of Allowance dated Aug. 23, 2023 for U.S. Appl. No. 29/752,251 (pp. 1-6).
Office Action (Notice of Allowance and Fees Due (PTOL-85)) dated Sep. 18, 2023 for U.S. Appl. No. 17/212,617 (pp. 1-8).
Office Action (Notice of Allowance and Fees Due (PTOL-85)) dated Sep. 28, 2023 for U.S. Appl. No. 17/212,658 (pp. 1-8).
Office Action (Notice of Allowance and Fees Due (PTOL-85)) dated Nov. 15, 2023 for U.S. Appl. No. 17/212,801 (pp. 1-5).
Office Action (Notice of Allowance and Fees Due (PTOL-85)) dated Nov. 9, 2023 for U.S. Appl. No. 17/212,658 (pp. 1-5).
Office Action (Notice of Allowance and Fees Due (PTOL-85)) dated Jan. 4, 2024 for U.S. Appl. No. 17/212,902 (pp. 1-8).
Office Action (Final Rejection) dated Feb. 2, 2024 for U.S. Appl. No. 18/058,643 (pp. 1-40).
Office Action (Notice of Allowance and Fees Due (PTOL-85)) dated Feb. 21, 2024 for U.S. Appl. No. 17/212,801 (pp. 1-6).
Office Action (Notice of Allowance and Fees Due (PTOL-85)) dated Mar. 6, 2024 for U.S. Appl. No. 17/212,902 (pp. 1-5).
Office Action (Non-Final Rejection) dated May 21, 2024 for U.S. Appl. No. 18/058,643 (pp. 1-30).
Office Action (Final Rejection) dated Nov. 6, 2024 for U.S. Appl. No. 18/058,643 (pp. 1-34).
Office Action (Final Rejection) dated May 16, 2025 for U.S. Appl. No. 18/503,633 (pp. 1-16).

* cited by examiner

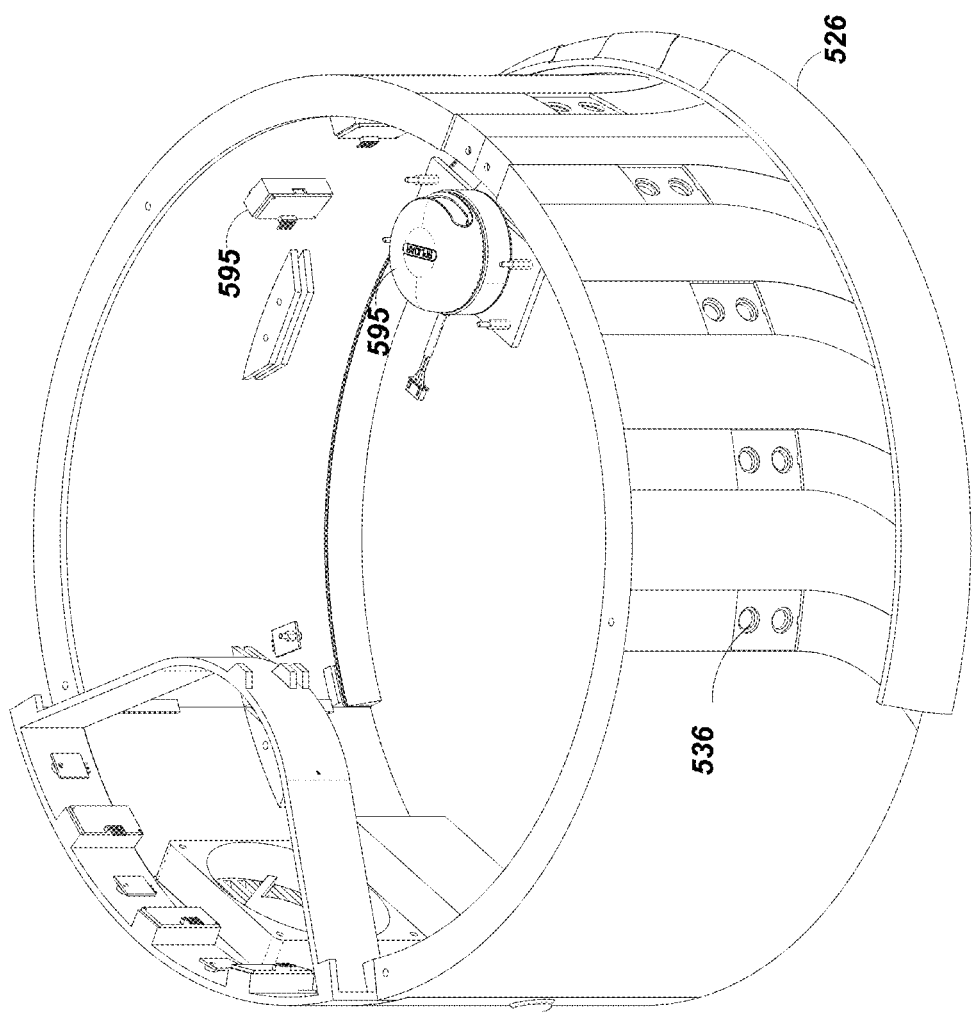

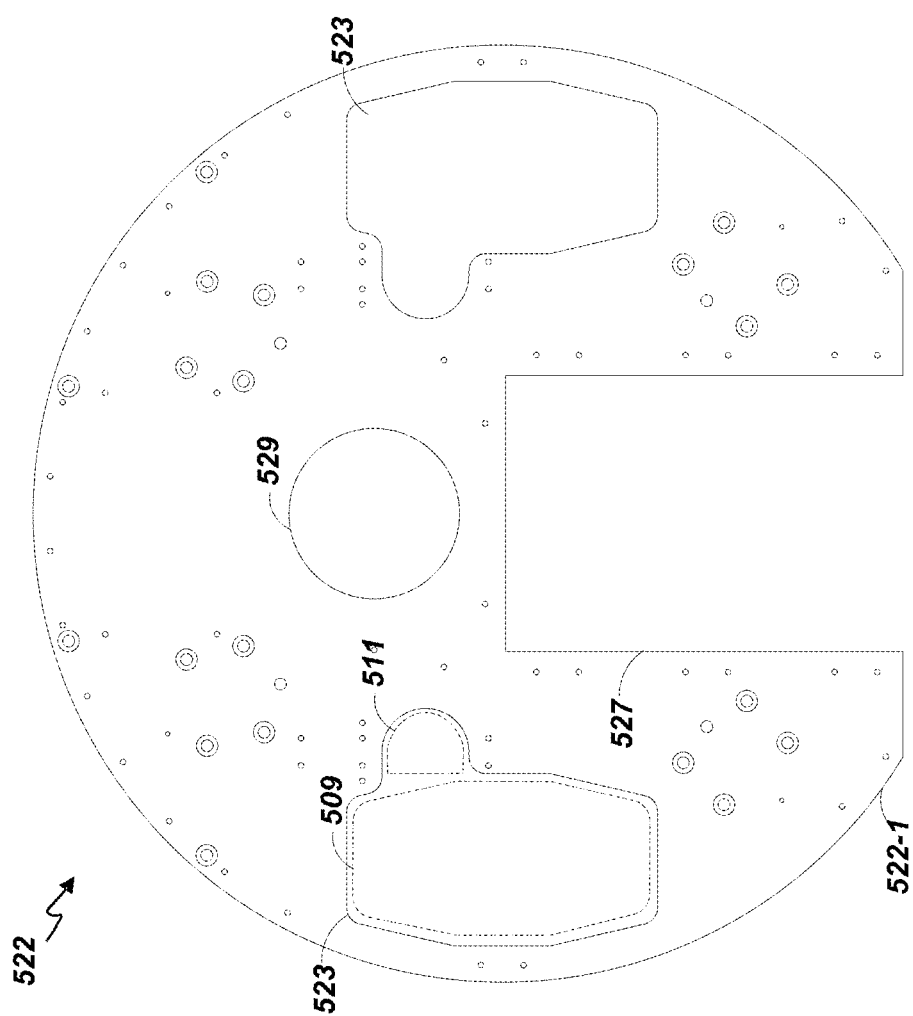

MOBILE KIOSK SERVICE ROBOT AND BASE ASSEMBLY FOR SAME

BACKGROUND

A kiosk service robot is an autonomous or semi-autonomous robotic apparatus that may be used in a gaming environment such as a casino or card room to provide gaming-related services to an operator or patron. Employing integrated and external communicatively associated systems, e.g., automation, control, network, communication, navigation, video and/or audio systems, a kiosk service robot may provide one or more services including, e.g., food and beverage services such as food and beverage order acceptance and food and beverage order delivery, currency transaction services such as automated teller machine (ATM) services, currency exchange and cashless ticket issuance and redemption, patron tracking services such as patron tracking account enrollment, patron tracking card printing and patron tracking account access, gaming facility navigation services such as providing facility maps, location direction and guidance, displaying mobile advertising, and/or gaming machine services such as hand-pays of jackpots, data collection, and gaming machine maintenance.

SUMMARY

In some implementations, a kiosk service robot may be provided that includes a base unit, a superstructure, and a first display. The base unit may include two drive wheels disposed on a first side of the base unit, each being independently drivable and arranged such that the two drive wheels have a track of between 14" and 18", a plurality of casters disposed on the first side of the base unit, the plurality of casters arranged such that each caster (or each caster pivot, if the casters are swivel casters) of the plurality of casters is radially offset from a track center of the two drive wheels by a distance of between 7" and 9", and a housing sized so as to be circumscribed by a cylindrical reference volume having a diameter of between 16" and 24". The housing may be configured to provide an exterior surface of the base unit. The superstructure may be connected with the base unit on a second side of the base unit opposite the first side of the base unit. The first display may be supported by the superstructure relative to the base unit and positioned such that a center of the first display is: a) located within the reference cylindrical volume of the housing and b) positioned between 42.5" and 52.5" away from a portion of the two drive wheels extending out of the housing.

In some implementations, the superstructure may be at least about five-feet high.

In some implementations, the base unit further may further include a bottom plate positioned within the housing. The bottom plate may include two wheel openings, each wheel opening corresponding in location to one of the two drive wheels. Each wheel opening has a cross-sectional shape that is sized larger than a cross-sectional shape of the corresponding drive wheel, thereby allowing the corresponding drive wheel to pass therethrough.

In some implementations, the base unit may further include a C-shaped plate disposed along an interior edge of the housing. The C-shaped plate may be vertically offset downward from the bottom plate by a plurality of vertical standoffs. The base unit may further include a bumper. The bumper may be connected to the base unit via the vertical standoffs.

In some implementations, the bottom plate may further include a cutout, and the cutout may be sized to receive a battery for providing power to the kiosk service robot.

In some implementations, the cutout of the bottom plate may be connected with a battery tray that is configured to support the battery from below and which may have a lower surface that may be at the same level as a lower edge of the housing.

In some implementations, the cutout of the bottom plate may be rectangular and may extend to an outer edge of the bottom plate.

In some implementations, the kiosk service robot may further include a controller configured to cause one or more touch-input controls to be displayed on the first display at a distance between 39" and 51", relative to portions of the two drive wheels that extend from the housing.

In some implementations, the kiosk service robot may further include a second display and a third display, such that the first and second displays are located on a front side of the kiosk service robot. The third display may be located on a back side of the kiosk service robot opposite to the front side of the kiosk service robot, and wherein the first display may be tilted between 10° and 20° from vertical.

In some such implementations, when the controller is in a first mode, the controller may further be configured to cause one or more touch-input controls to be presented only on a lower portion of the first display and no touch-input controls to be presented on an upper portion of the first display.

In some implementations, each of the plurality of casters may be connected to the bottom plate through a mounting element that prevents vertical movement of that caster relative to the bottom plate.

In some implementations, the plurality of casters may include four casters, and each of the casters may be connected to the bottom plate through two corresponding rectangular blocks.

In some implementations, each of the drive wheels may include a corresponding hub motor.

In some implementations, each of the drive wheels may be supported relative to the base unit by a corresponding suspension element.

In some implementations, the suspension element may include a swing arm that is connected to a pivot of the corresponding drive wheel through a pillow block.

In some implementations, the kiosk service robot may further include one or more sensors enclosed by the housing and configured to detect obstacles blocking a trajectory of the kiosk service robot within a predetermined range of the base unit. The housing may include one or more sensor windows, each sensor window corresponding to one of the sensors.

In some implementations, the one or more sensors may include a sonar sensor.

In some implementations, each caster of the plurality of casters are radially offset from the track center of the plurality of casters by the distance of approximately 15.5".

In some implementations, the housing may be sized so as to be circumscribed by the cylindrical reference volume having the diameter of approximately 22".

In some implementations, the first display may be positioned such that the center of the first display is positioned approximately 47.75" away from the portion of the two drive wheels extending out of the housing.

This summary is neither intended to identify key or essential features of the claimed subject matter nor be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 5C depicts an example housing of the base unit in accordance with various embodiments described herein.

FIG. 5D illustrates an example bottom plate of the kiosk service robot in accordance with various embodiments described herein.

Figure 1:
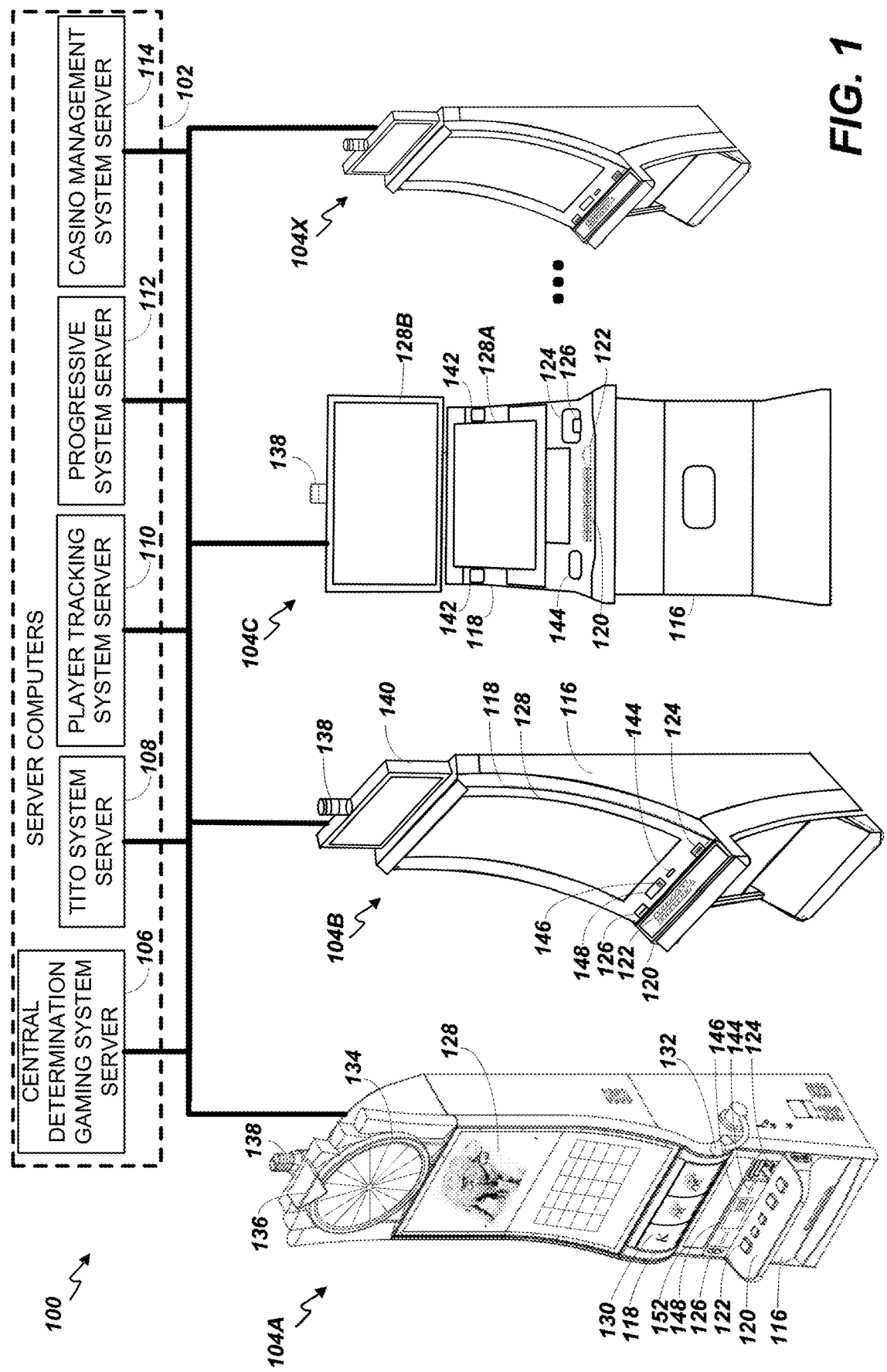
FIG. 1 is an example diagram showing several EGMs networked with various gaming-related servers.

Like reference symbols in the various drawings indicate like elements, in accordance with certain example implementations. In addition, multiple instances of an element may be indicated by following a first number for the element with a letter or a hyphen and a second number. For example, multiple instances of an element 110 and/or different portions/sides of element 110 may be indicated as 110-1, 110-2, 110-3 etc. or as 110a, 110b, 110c, etc. Unless specifically pointed out, when referring to such an element using only the first number, any instance/portions/sides of the element is to be understood (e.g., element 110 in the previous example would refer to elements 110-1, 110-2, and 110-3 or to elements 110a, 110b, and 110c).

DETAILED DESCRIPTION

To provide services such as the above-mentioned examples, kiosk service robots need to be able to move from place to place (e.g., moving from a current location to a target location) under potentially challenging conditions, e.g., over terrain such as ramps or door thresholds. Moreover, the present inventor determined that it would be beneficial for the kiosk service robot to have a height that falls within a particular range of heights (e.g., 4 feet to 6 feet) in order to vertically locate various user-interface (UI) elements, e.g., display screens and touch-screen controls, so that such UI elements are conveniently accessible to users that are sitting as well as standing. Additionally, the present inventors determined that limiting the footprint of such kiosk service robots to generally be equivalent to the footprint of an average adult human male would be beneficial since such service kiosk robots would thus take up approximately the same amount of floor space as a human attendant. Such a limited footprint would also prevent such kiosk service robots from appearing too imposing or intimidating to patrons. Kiosk service robots having such a height may be more susceptible to being tipped over due to their elevated centers of gravity and small footprint. However, kiosk service robots having base units such as are described herein were found to offer superior stability in typical casino environments over base units with other configurations. Such environments may have different obstacles or terrain features that kiosk service robots such as those described in more detail later below may be better equipped to handle by virtue of their footprint in combination with their center of gravity, drive wheel track, and caster positioning. For example, such kiosk service robots may be better able to navigate over or past different items laying on the ground, such as personal belongings (e.g., straps for purses, hats, or bags) and/or facility-related foreign objects such as electrical cables (e.g., power cords, network cables, or floor cord covers for such cables or cords) and may also be more resistant to being tipped over due to collisions or interactions with patrons, e.g., children, inebriated patrons, or patrons who are simply not watching where they are going and may thus run into a kiosk service robot.

Accordingly, this disclosure is generally directed at kiosk service robots having a base unit, a superstructure, one or more controllers, and one or more displays that are supported by the superstructure and are positioned to be easily readable and, if used to present touch-screen controls, easily touched by typical adult users that are either standing or sitting. Such kiosk service robots are typically employed in casino settings, or other venues in which there may be a large number of people in attendance, and may be used to provide information and services to patrons. To that end, kiosk service robots may be designed to have sufficient mobility to be able to navigate adequately within such environments, a design that facilitates easy interaction with the displays of the kiosk service robots by patrons, a size and form factor that do not take up excessive room, sufficient stability to avoid being easily tipped over, and/or an overall appearance that is not threatening or off-putting to patrons.

To facilitate some or all of the above, kiosk service robots may be designed such that their superstructures have heights of at least three feet relative to the ground, thereby allowing for one or more displays of such kiosk service robots to be positioned so as to be easily read or viewed by a seated or standing patron. For example, superstructures of kiosk service robots may be designed so as to position one or more displays of the kiosk service robot at elevations of 30" or higher off the ground. At the same time, it may also be desirable in some cases to limit the height of the superstructure so that such the display or displays supported thereby do not extend past a predetermined height, e.g., four to six feet (or approximately the height of a typical adult human male, for example). Limiting the height of the kiosk service robot superstructure may help make the kiosk service robot less physically imposing to patrons, help with lowering the center of gravity of the kiosk service robot (thus improving stability), and may also facilitate passage of the kiosk service robot through doorways or other structures having vertical clearances that are sized to allow for passage of adult humans.

Displays that are included in kiosk service robots may generally be provided for at least one, if not both, of two purposes—displaying graphical content, e.g., maps, advertising, drink menus, etc., and/or providing touch-screen interfaces to allow patrons to interact with the kiosk service robot. To that end, some kiosk service robots may feature a generally upright display, e.g., oriented so as to have a display surface that is at between 0° from vertical and 20° from vertical, that may be primarily used for the first purpose, e.g., displaying graphical content. Such an orientation may position the graphical content displayed thereon so that it may be easily seen by patrons that are both immediately next to the kiosk service robot as well as some distance off from the kiosk service robot. Displays that are to be used primarily for the second purpose above may, in contrast, be oriented in a generally prone manner, e.g., with the display surface of such displays oriented between about 0° and 30° from horizontal. Such an orientation may make it easier for nearby patrons to interact with such displays to provide touch-input. At the same time, touch inputs provided to displays in such orientations may provide primarily downward-directed force, thereby reducing the amount of horizontally directed force exerted on such displays and thus reducing the possibility that the kiosk service robot may inadvertently be tipped over by a patron pushing on the display to make a touch-screen selection.

Some implementations of kiosk service robots may have a base unit having two motor-equipped drive wheels that are configured to rotate about generally parallel axes of rotation. Such implementations may also include a plurality of non-driven casters that may each be positioned (or, if they are swivel casters, may have swivel axes that are positioned) so as to be between 7" and 9" from a center axis midway between the two drive wheels (e.g., between about 7.5" to 8.5", such as 7.5", 7.7", 7.9", or 8.1" from a track center). The drive wheels may similarly be about 7" to 9" from that same center axis (e.g., having a track of between 14" and 18"); such an arrangement of drive wheels and casters in the base unit was found to be relatively ideal in terms of balancing the overall footprint and desired height of kiosk service robots with a high degree of stability. Kiosk service robots having such arrangements of drive wheels and casters were found to be more resistant to tip-over events than kiosk service robots with other dimensional characteristics with regard to wheel track and caster locations, e.g., better able to accommodate navigating over obstacles that may be found on casino gaming venue floors, such as electrical cords and/or cord covers, in-floor outlet covers, transitions between carpeted and non-carpeted areas, debris left on floors by patrons, and/or objects such as purse straps or other items that might tend to fall into the areas in which a kiosk service robot might navigate. Kiosk service robots with base units having such wheel and caster arrangements may also be well-suited to navigating up and down ramps that may be provided within casino environments for disability access.

The base unit may further include a housing configured to provide an exterior skin of the base unit, thus hiding the internal components of the base unit. In some implementations, the housing may be sized so as to be circumscribed by a cylindrical reference volume having a diameter of between 16" and 24" (e.g., between about 20" and 23", such as 21", or 22") in order to constrain the size of the kiosk service robot such that it is non-threatening/non-intimidating to human patrons and does not take up an excessive amount of floor space, e.g., such that it occupies approximately the same amount of floor space as an adult human.

The drive wheels and casters of the base unit may be located on a first side of the base unit. The superstructure may be connected with the base unit on a second side of the base unit opposite the first side of the base unit and may be configured to support the one or more displays, at least one of which may be configured to display one or more touch-sensitive controls, relative to the base unit. For example, in some implementations, a kiosk service robot may include a first, a second, and a third display supported by the superstructure. In some such implementations, the first and second displays may be located on a front side of the kiosk service robot and the third display may be located on a back side of the kiosk service robot opposite the front side of the kiosk service robot.

In some implementations, when operated in certain mode (s) (e.g., a kiosk mode, where patrons can input instructions/controls to the kiosk service robot by touching the touch-input controls displayed on one of the displays), the controllers of the kiosk service robot may be configured to cause the one or more touch-input controls to be presented only on a lower portion of that display and to cause no touch-input controls to be presented on an upper portion of that display. In doing so, the potential for patrons exerting lateral forces on the kiosk service robot at elevations that generate moment arms that may be sufficient to cause the kiosk service robot to tip over may be reduced, thereby reducing the chance of a tip-over event.

The following discussion relates generally to systems that may be found in casino gaming environments and is then followed by a discussion relating to kiosk service robots that may be used in such an environment.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (Wi-Fi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main or service door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Reim XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
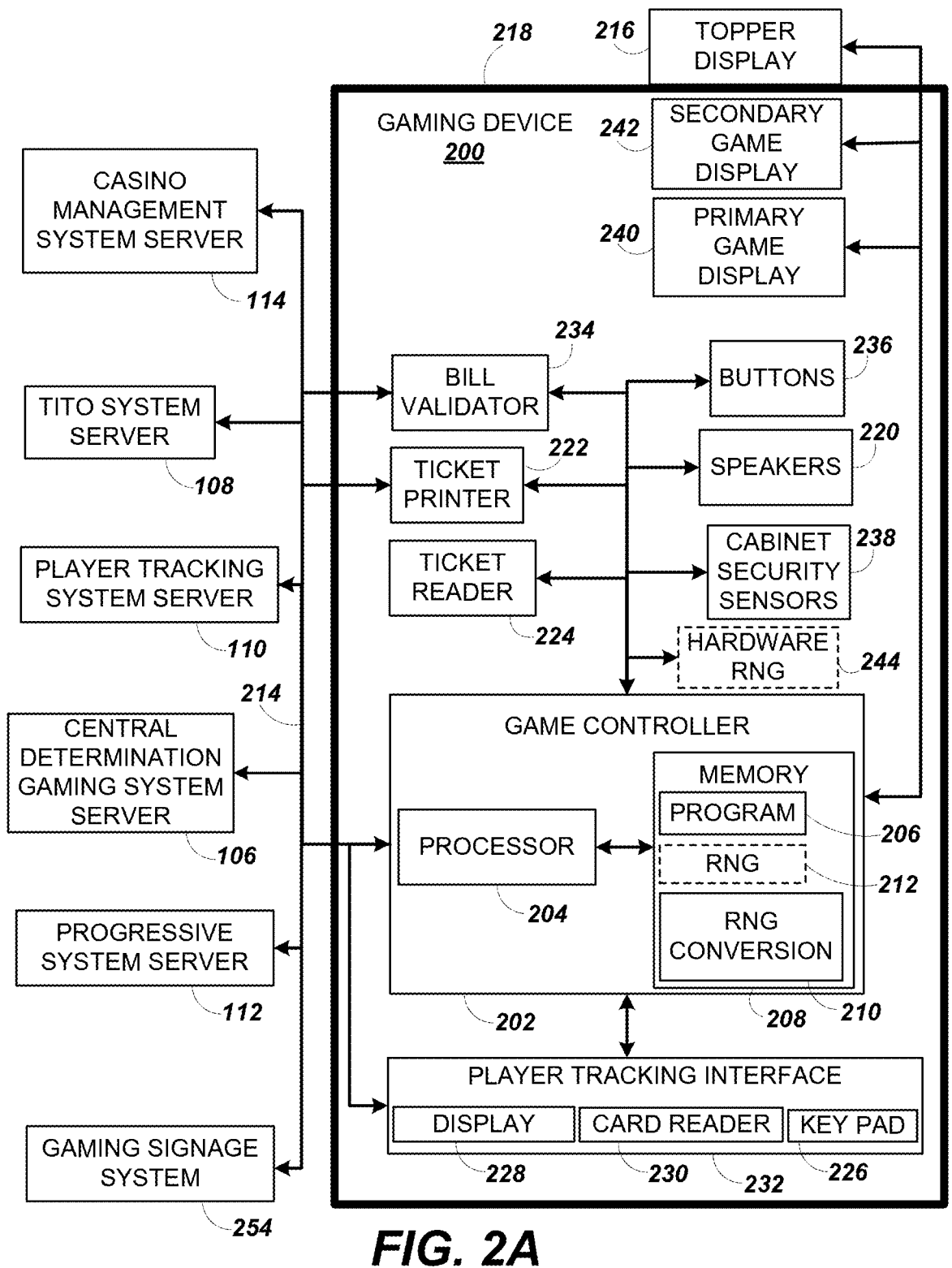
FIG. 2A is a block diagram showing various functional elements of an example EGM.

Many or all the above-described components can be controlled by circuitry (e.g., a gaming controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main or service door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some embodiments, main display 128A is a flat panel display. Main display 128A is typically used for primary game play while secondary display 128B is typically used for bonus game play, to show game features or attraction activities while the game is not in play, or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of pay lines, maximum jackpot, progressive or non-progressive, bonus games, and may be deployed for operation in Class 2 or Class 3, etc.

FIG. 2A is a block diagram depicting examples of internal electronic components of a gaming device 200 connected to various external systems. All or parts of the example gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and non-volatile memory and other types of non-transitory data storage components. Volatile memory is memory that do not retain data values upon loss of power. Non-volatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random-access memory (SRAM), dynamic random-access memory (DRAM), magnetic random-access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, and game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). FIG. 2A illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game displays 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
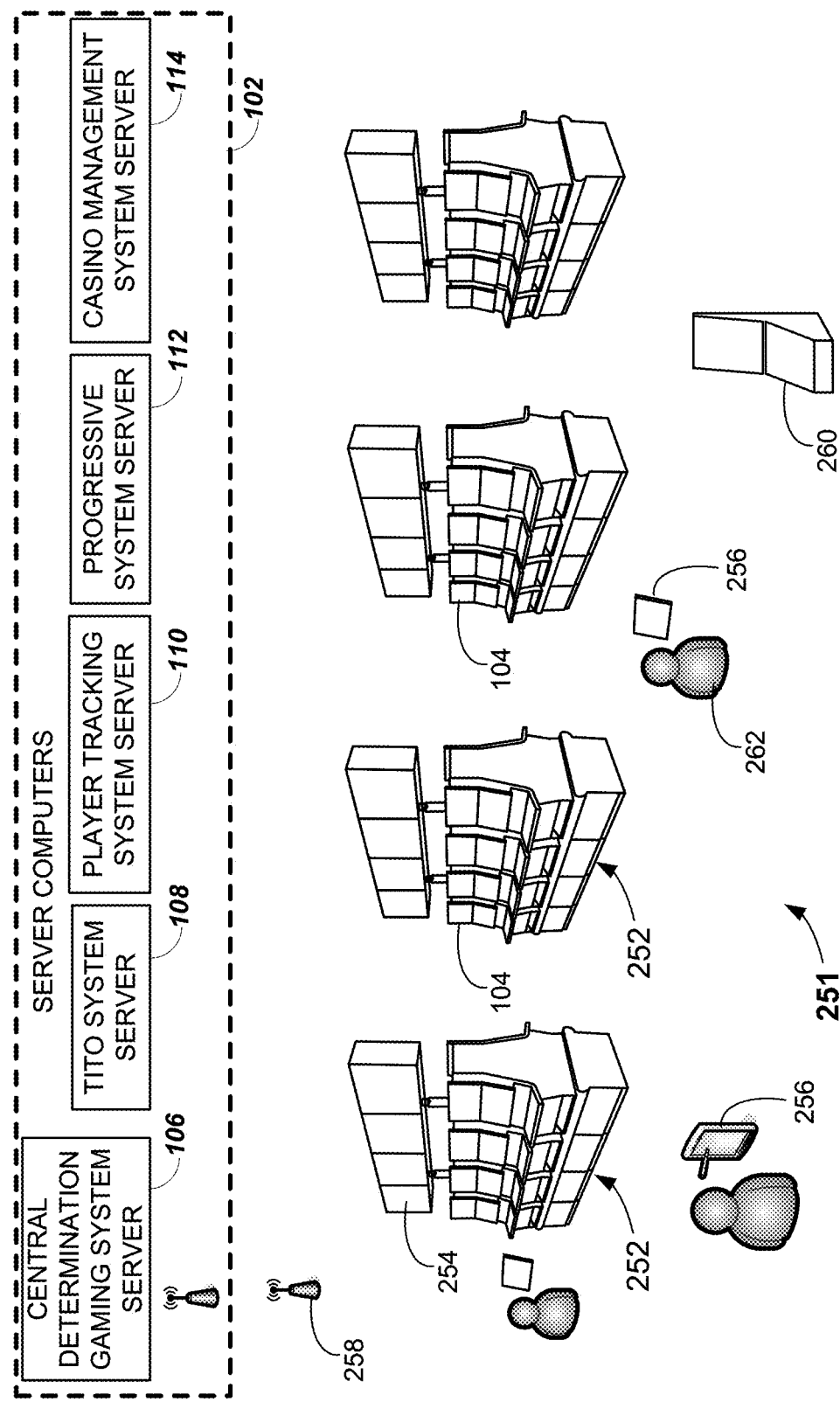
FIG. 2B depicts a casino gaming environment according to one example.

FIG. 2B depicts a casino gaming environment according to one example. In this example, the casino 251 includes banks 252 of gaming device 104. In this example, each bank 252 of gaming device 104 includes a corresponding gaming signage system 254. According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the gaming device 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
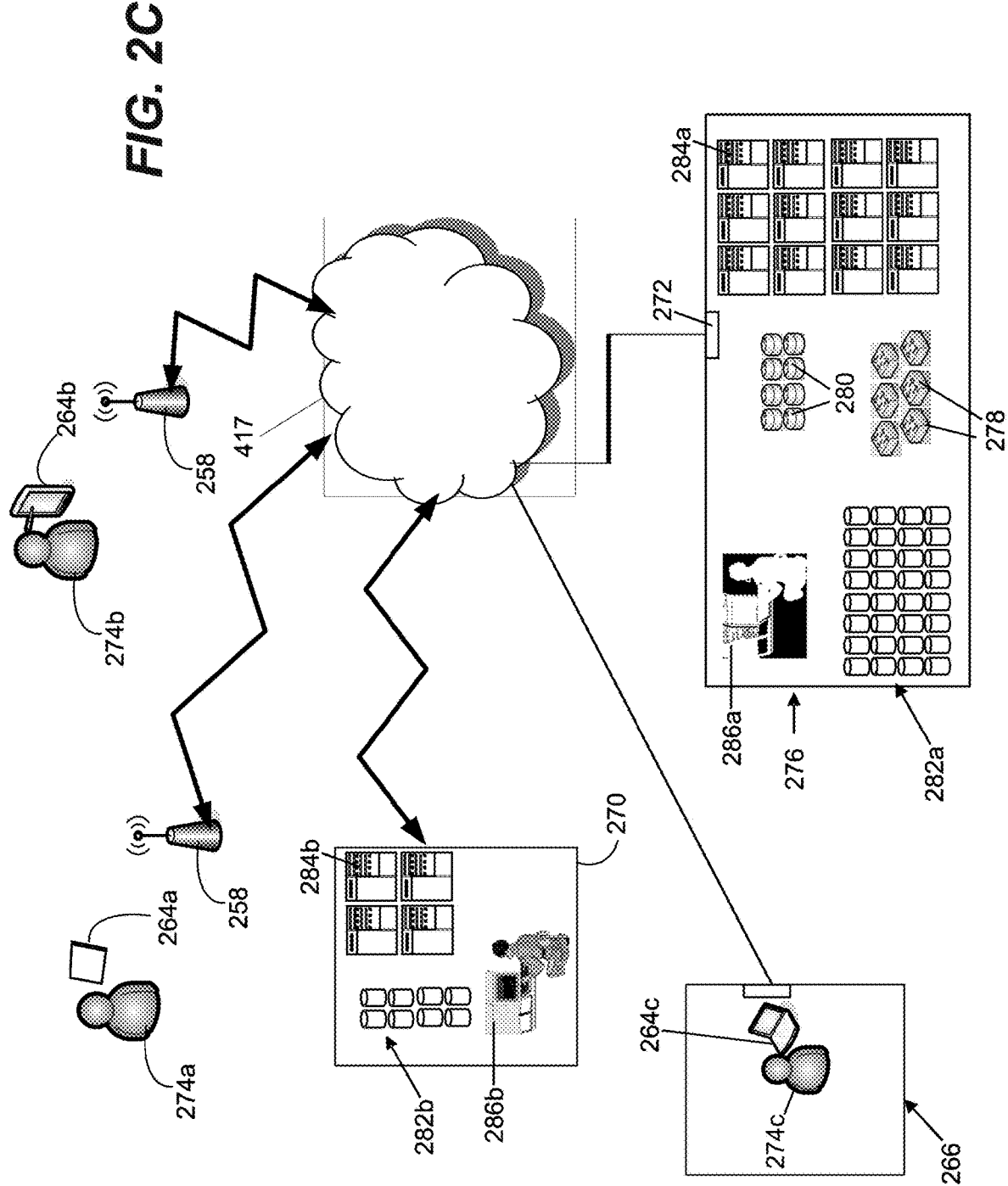
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3A:
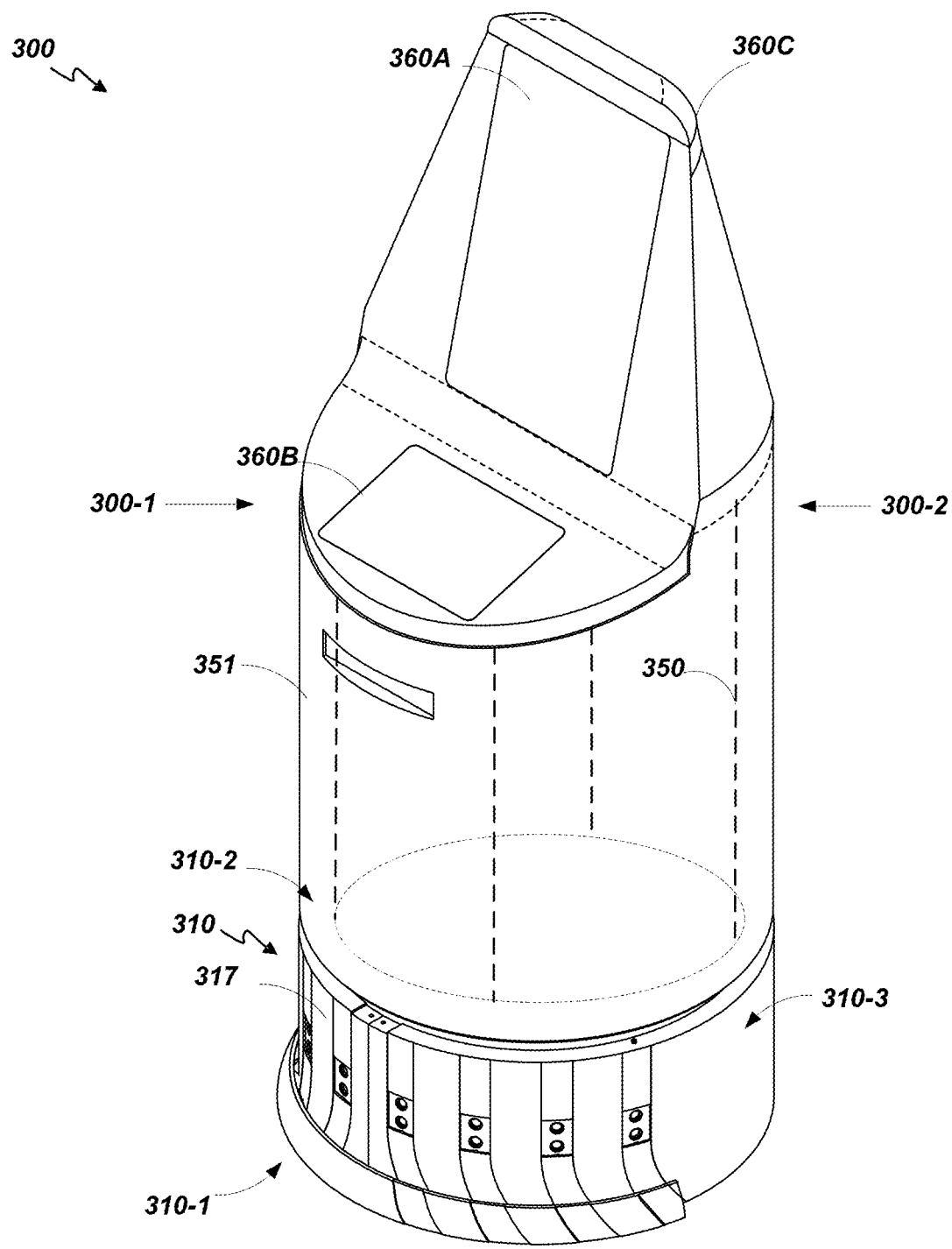
FIG. 3A illustrates an example kiosk service robot in accordance with various embodiments described herein.

FIG. 3A illustrates an example kiosk service robot 300 in accordance with various embodiments described herein. In some embodiments, the kiosk service robot 300 may be a mobile and autonomous version of the kiosk 260 shown in FIG. 2B. As illustrated in FIG. 3A, the kiosk service robot 300 may include a base unit 310, a superstructure 350 (e.g., partially shown in dashed lines) covered by an enclosure 351, and one or more displays 360. In some embodiments, the base unit 310 may include a housing 317 configured to provide an exterior surface 310-3 of the base unit 310. In some embodiments, to avoid creating an intimidating effect and/or creating a potential obstacle to patrons (e.g., by occupying too large a space), the housing 317 may be sized to be circumscribed within a cylindrical reference volume sized to be generally equivalent to, or no larger than, a space occupied by a regular-sized human being when standing (e.g., having a diameter of between about 16" and 24", such as about 19", 20", 21", or 22").

As noted earlier, the base unit 310 may include a pair of drive wheels and a plurality of casters (not visible in FIG. 3A) that are located on a first side of the base unit 310. In some embodiments, the superstructure 350 may connect with the base unit 310 on a second side 310-2 (e.g., the upward-facing side) of the base unit 310 opposite the first side of 310-1 (e.g., the downward-facing side) of the base unit 310. In some embodiments, the one or more displays 360 may be supported by the superstructure 350 relative to the base unit 310. In some embodiments, the one or more displays 360 may include a primary display (e.g., a first display 360A), a service display (e.g., a second display 360B), and a secondary display (e.g., a third display 360C).

For example, the primary and service displays (e.g., the first and second displays 360A and 360B) may be located on a front side of the kiosk service robot 300-1 (e.g., facing in the direction that the kiosk service robot generally travels in), and the secondary display (e.g., the third display 360C) may be located on a back side of the kiosk service robot 300-2, opposite to the front side of the kiosk service robot 300-1. In some embodiments, at least one of the one or more displays 360 (e.g., the first display 360A and/or the second display 360B) may be configured to display touch-input controls (e.g., interactive GUIs).

In some embodiments, the one or more of displays 360 can include color displays of any size, resolution, or color depth, such as high definition or 4K displays. Any of the displays 360 (e.g., the first display 360A and/or the second display 360B) may also include touchscreen capabilities, e.g., via a touch-input device layer or layer(s) (e.g., overlaid on the displays 360) that allow the user to interact with the kiosk service robot 300 by providing touch input in conjunction with graphical output provided on the underlying display 360 (e.g., touch gestures provided via virtual buttons or other digital objects provided on the display).

In some embodiments, the kiosk service robot 300 may be configured to provide a graphical user interface (GUI) to users for a variety of functions, such as for kiosk operations (e.g., hand-pays of jackpots, data collection, maps, venue events), ordering food or beverages, displaying mobile advertising, playing electronic games, or the like. Different displays 360 may be configured for different functions, such as a large "primary display" (e.g., first display 360A) oriented to face the patron during a task for providing graphical content, a service display (e.g., the first display 360A and/or second display 360B) for providing touch-input controls with virtual keyboard, and one or more secondary displays (e.g., third display 360C) oriented away from the user for providing mobile advertising to patrons behind the kiosk service robot.

In some embodiments, the first display 360A may be positioned such that a center of first display 360A is: a) located within the reference cylindrical volume circumscribing the housing 317 and b) positioned between 39" to 56.5" above the portion of the two drive wheels that is furthest from the first display 360A, i.e., extending out of the first side 310-1 of the base unit 310 (e.g., the drive wheels may protrude out from the underside of the base unit 310 by approximately 1", e.g., between 0.75" and 1.5" or between 0.9" and 1.2", e.g., by 1.1"). The first display 360A may also, in some implementations, be tilted between 10° and 20° degrees (e.g., be tilted 12°, 13°, 14°, 15°, or 16°) from vertical. Similarly, the second display 310B may be tilted between 10° and 20° (e.g., be tilted 13°, 14°, 15°, 17° or 19°) horizontal. Displays that are positioned and/or tilted in such a manner may allow a patron seated or standing at a gaming device, a gaming table, or otherwise within the gaming venue and in front of the kiosk service robot 300 to easily view the information and/or touch-input controls displayed on the primary and service displays (e.g., the first and second displays 360A and 360B) from both the sitting and standing positions.

In some implementations, the kiosk service robot 300 may be configured so as to reduce the chance of a tip-over event caused by an overzealous or inebriated patron. For example, patrons that are excited, inebriated, tired, or otherwise impaired may, when interacting with the kiosk service robot 300, inadvertently exert much more force than is needed in order to activate a touch-screen control. As the displays 360 that show the touch screen controls may be in a location that is elevated above the ground by some distance, e.g., between 30" and 72" above the ground (e.g., the first display 360A may be at about 39" to 56.5" from floor, the second display 360B may be at about 35.1" to 37" from floor, and the third display 360C may be at between about 41" to 54.5" from floor), the force that is delivered to the displays 360 may cause a sizable moment to be applied to the kiosk service robot, potentially causing the kiosk service robot to tip over.

To reduce the potential for such user interactions inadvertently causing the kiosk service robot to tip over, some kiosk service robots may be configured to cause the touch-input control or controls to be presented only on a lower portion of the first display 360A and no touch-input controls to be presented on an upper portion of the first display. For example, the first display 360A may be configured (e.g., caused by a controller of the kiosk service robot 300) such that no touch-input controls are caused to be displayed on upper third of the first display 360A, upper half of the first display 360A, upper two-thirds of the first display 360A, etc. In some such cases, the controller may be configured to cause no touch-input controls to be displayed on the first display at all. This discourages patrons from trying to push on the upper portion of the primary display (or at least removes a reason for them to do so), thus potentially shortening the moment arm that may be generated if a patron pushes on the first display 360A too hard when selecting a displayed touch-input control. In some embodiments, such functionality may be implemented only when the kiosk service robot is in a particular mode or modes (such as a customer service mode); when operating in other mode(s) (e.g., a maintenance/administrative mode), the primary display may be configured to display the touch-input controls in the entire area of the display to be able to provide more operational options (e.g., for a technician to perform maintenance/administrative operations). When the kiosk service robot is in such a mode, e.g., a maintenance/administrative mode, the individual that may be interacting with the kiosk service robot is most likely a trained employee that is unlikely to exert undue force on the first display 360A. Thus, there may be little benefit from a tip-over avoidance perspective to limiting the locations where there are touch-input controls presented on the first display 360A in such a mode (and having more of the screen real estate of the first display 360A available for touch-input controls may make the GUI that is presented to the employee easier to navigate).

In some embodiments, the base unit 310 may further include one or more wheels (not shown) extending out of the base unit 310 (e.g., protruding past the lower edge of the housing 317) from the first side 310-1 of the base unit 310. As will be discussed in more detail below, the one or more wheels may be configured to provide support and motive force to the kiosk service robot 300.

Figure 3B:
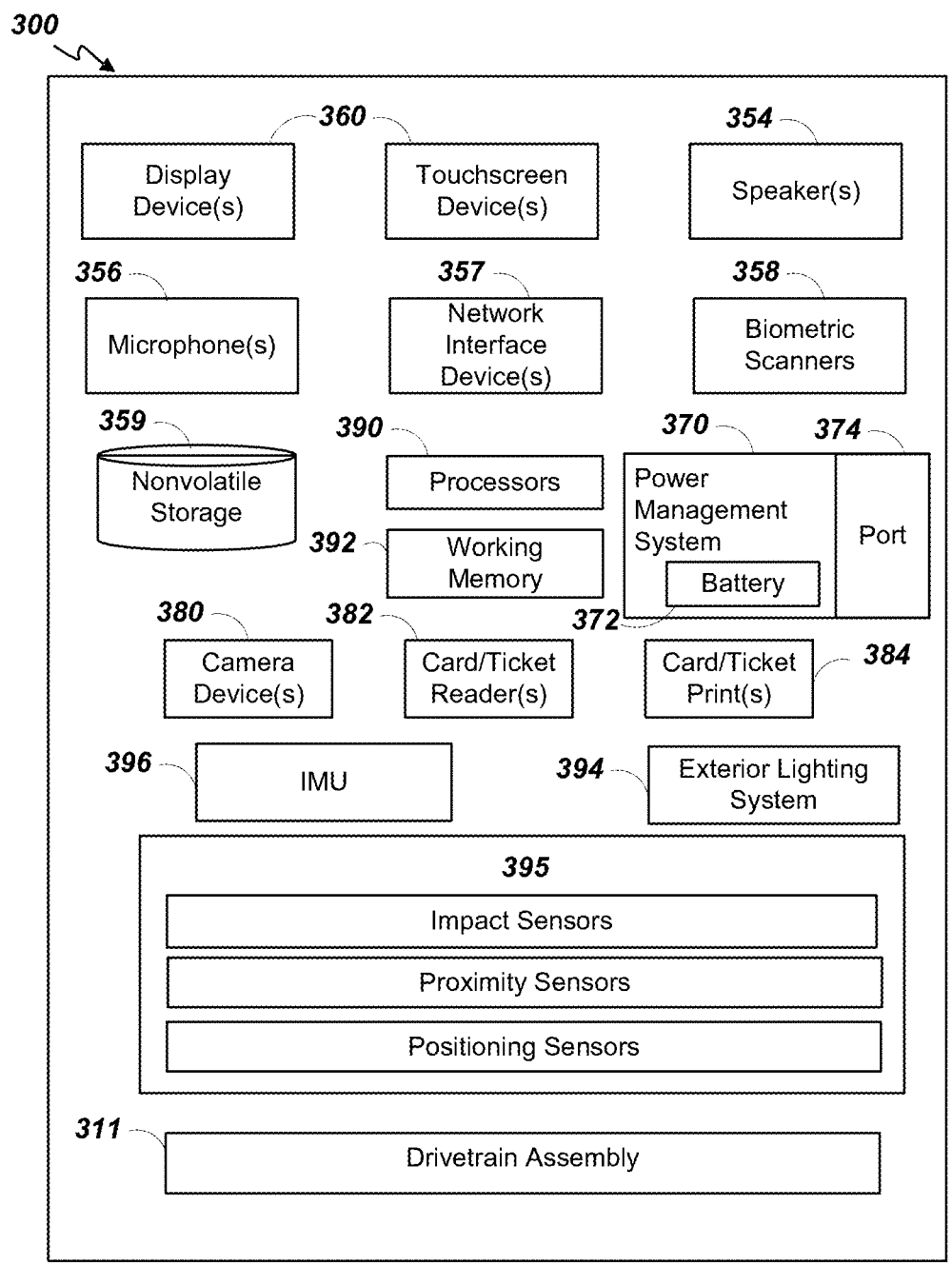
FIG. 3B illustrates various hardware components of the example kiosk service robot.

FIG. 3B depicts various hardware components that may be included in example kiosk service robot 300. It is contemplated that a person skilled in the art will appreciate that kiosk service robot 300 may include more or fewer components than depicted in FIG. 3B, depending on the particular task that the kiosk service robot is intended to complete. In other words, kiosk service robot 300 may include more components than as illustrated in FIG. 3B or fewer components than shown in FIG. 3B.

In some embodiments, kiosk service robot 300 may include one or more processors 390 (e.g., that may be part of one or more controllers) that use working memory 392 (e.g., random access memory or the like) and non-volatile storage 359 (e.g., solid state drive, disk drive, or the like) to execute an operating system and various software systems for controlling operation of kiosk service robot 300 and the various components that may be included therein. processors 390 may be connected to any or all of the components in kiosk service robot 300 (e.g., via internal data busses, networks, or wireless channels, not shown) such as to allow control and communication with the components as described herein. In some embodiments, processors 390 may include one or more dedicated processing CPUs such as, for example, one or more graphics processing units (GPUs), each of which may include additional dedicated memory. Further, while not separately depicted here, any or all of the components shown here may be housed in housing 317 and/or the enclosure 351.

Kiosk service robot 300, in the example embodiment, also includes a power management system 370 that is configured to provide electrical power to any or all of the components of kiosk service robot 300. In some embodiments, power management system 370 may include a bank of one or more batteries 372 (e.g., rechargeable batteries), as well as a recharging port (or just "port") 374 that provides an interface through which batteries 372 can be recharged from an external power source (e.g., at a recharging station). In some embodiments, port 374 includes an electrical coupling interface (e.g., connector) that may be mechanically coupled to a complementary interface to repower batteries 372 (e.g., at a recharging station or the like). For example, the operations venue may include a designated area that is configured with one or more recharging stations for kiosk service robot 300. Kiosk service robot 300 may be configured to move to a recharging station upon command from a robot management system server 207 or autonomously (e.g., upon detecting that a remaining charge level is below a pre-determined threshold). In some embodiments, the robot management system may be configured to centrally orchestrate recharging amongst a fleet of kiosk service robots 300 by monitoring battery life remaining in each kiosk service robot and then determining when to send a particular kiosk service robot 300 to recharge while leaving enough active kiosk service robots 300 active to field service requests (e.g., having the lowest two kiosk service robot 300 going to recharge while the remaining eight kiosk service robot 300 of a fleet of ten remain in service). Upon arrival at the recharging station, kiosk service robot 300 may automatically mate with ("dock at") the recharging station by arranging port 374 to be aligned with a particular position on the recharging station (e.g., a complementary recharging port) and moving kiosk service robot 300 until port 374 is properly connected. In some embodiments, port 374 may include a wireless coupling interface that allows batteries 372 to be wirelessly recharged at a complementary wireless recharging location when properly positioned proximate the complementary recharging interface. In some scenarios, kiosk service robot 300 may be manually connected to the recharging station or via a power cord (e.g., by a service technician or other human support personnel).

In the example embodiment, kiosk service robot 300 may also include one or more network interface devices 357 that enable wireless communication between kiosk service robot 300 and various wireless networks described herein. For example, kiosk service robot 300 may include a Wi-Fi network interface that allows wireless connection to one or more Wi-Fi access points installed at the operations venue. Such wireless network access provides network connectivity to the robot management system server 207 and may provide network connectivity to other infrastructure servers and networks such as network 214, to other kiosk service robot 300, or to the Internet. In some embodiments, network interface devices 357 may include NFC beacons (active or passive), Bluetooth beacons, or other wireless network devices that allow proximity connection to nearby devices. Such proximity connections may allow kiosk service robot 300 to wirelessly communicate with nearby gaming devices 200, other kiosk service robot 300 (e.g., kiosk 260 shown in FIG. 2B), mobile gaming devices 256 or EUDs 264, or with recharging stations. In some embodiments, network interface devices 357 may include cellular network interfaces (e.g., for connectivity to 3G/4G/5G cellular networks).

In some embodiments, as described in more detail below, drivetrain assembly 311 of kiosk service robot 300 may include one or more motors (e.g., hub motors) that may be actuated to drive a plurality of drive wheels. Gears (or gear boxes) may be configured to transfer power from the motors to turn the drive wheels. Drivetrain assembly 311 may be configured to move kiosk service robot 300 within the operations venue during operation based on operations received from the processors 390. In some embodiments, drivetrain assembly 311 is configured as a tank-drive configuration, which provides two independent treads or tracks (and associated wheels) to provide longitudinal movement (e.g., forward and backward, based on orientation of the chassis) and to turn kiosk service robot 300. In some embodiments, drivetrain assembly 311 may be configured as a Mecanum drive configuration, which provides Mecanum wheels with specialized angled rollers to additionally allow lateral (side-to-side, or "strafing") movement. In some embodiments, drivetrain assembly 311 may be configured as a slide drive (e.g., "H-drive"), which provides a tank drive modified with omni-directional wheels (e.g., "omni wheels") in place of typical traction type wheels, as well as an additional omni wheel oriented perpendicular to the other wheels to provide lateral movement. In some embodiments, drivetrain assembly 311 may be configured as a butterfly drive (or a grasshopper drive), which includes four butterfly modules (not shown) at each corner the bottom of base unit 310 (e.g., first side of the base unit 310-1), where each butterfly module includes a traction wheel and an omni wheel that may alternatively be shifted to engage one or the other, depending on movement demands. In some embodiments, drivetrain assembly 311 may be configured as a kiwi drive (or a "holonomic drive"), which uses three omni wheels in triangular configuration to enable 360-degree surface movement. In some embodiments, drivetrain assembly 311 may be configured as a swerve drive, which is a holonomic drive train in which all drive wheels are independently driven and steered, allowing kiosk service robot 300 to move in any direction and independently change kiosk service robot 300 orientation. Any other type of drivetrain that enables the systems and methods described herein may be used. It should be understood that FIG. 3B illustrates only the basic components of an example drivetrain assembly 311, and that other components may be used, but are excluded here for purposes of brevity (e.g., various rotary, linear, or incremental drivetrain encoders, transducers, and so forth). It is understood that drivetrain assembly 311 may be configured as other drive types, for example, may be configured as the two-wheel tank-drive version as describe in detail below.

Kiosk service robot 300 may also include one or more display devices (or just "displays") 360 and any of the displays 360 may touchscreen device(s) (e.g., overlaid on the display 360) in the example embodiment as illustrated in FIG. 3A. For ease of illustration, the description of displays 360 will not be repeated.

Kiosk service robot 300 might have a 3D fan display 'head', e.g., enclosed in a transparent (glass, Plexiglas, etc.) dome, used to provide dynamic display of, e.g., a humanistic head, or a robot head, or other information such as a coin, vehicle, dollar sign (e.g., $) or dollar amount image that might be an award.

In some embodiments, kiosk service robot 300 may include one or more audio output devices (or "speakers") 354 and one or more audio input devices (or "microphones") 356. Speakers 354 may, for example, provide audible advertisements, audio output of an electronic game, or accessibility audio. Microphones 356 may capture local audio input, for example, to accept verbal commands or interactions from the user, to perform voice recognition of the user (e.g., for user authentication, voice recognition), or to capture ambient noise at a particular location (e.g., for evaluation of noise levels or operational function of a gaming device 200). In some embodiments, speakers 354 and microphones 356 may be used together to provide integrated audio interaction between the user and kiosk service robot 300 (e.g., accepting and responding to voice commands, providing verbal questions or queries). In some embodiments, kiosk service robot 300 may be configured to display closed captioning of speech content output by kiosk service robot 300. In some embodiments, kiosk service robot 300 may be configured to provide entertainment functions through use of displays 360 and speakers, including playing songs or videos, telling jokes, performing animated movements or dances (e.g., alone or with other kiosk service robot 300), or any combination thereof.

In some embodiments, kiosk service robot 300 may include one or more biometric scanners 358 that may be used for user authentication. For example, kiosk service robot 300 may include a fingerprint reader or handprint reader for scanning a fingerprint or hand geometry of the user. Kiosk service robot 300 may include a retinal scanner for performing iris recognition of the user. In some embodiments, input from microphones 356, camera devices 380, or thermal cameras (not separately shown) may be used to capture biometric data (e.g., voice samples for voice recognition, facial images or thermal images for facial recognition, emotion detection, head geometry, or the like). In some embodiments, thermal data may be used to detect the presence and focus of a nearby patron, thus causing kiosk service robot 300 to turn attention to that patron.

Kiosk service robot 300, in the example embodiment, also includes one or more camera devices 380. Some camera devices 380 capture digital video input data (or just "camera data") in a field of view ("FOY") near kiosk service robot 300 which may be used for a variety of purposes. Such camera data may include still images or full motion video (e.g., 30 frames per second, or the like, in black and white, full color). In some embodiments, the captured camera data may be used for purposes of robot movement. For example, the captured camera data may be used for object detection, object recognition, obstacle avoidance, position determination within the venue, or travel orientation. In some embodiments, some camera devices 380 may be 3D depth cameras configured to capture 3D depth data. Such depth data can similarly be used for such movement functions. Some camera data may be used for facial recognition to authenticate users. Some still images or full motion video camera data may be used to evaluate health status of gaming devices 200 (e.g., to detect damaged components, malfunctioning components, or the like). Some camera data may be used for security operations (e.g., fraud detection). In some embodiments, the camera data may be used to provide users with personal photos of themselves and their companions, or to capture a profile image of the user (e.g., for loyalty account registration). In some embodiments, kiosk service robot 300 may include a thermal camera that can similarly be used, for example, for object detection, obstacle avoidance, and the like.

In some embodiments, kiosk service robot 300 may be configured to include one or more card readers 382A or ticket readers 382B (collectively, "readers 382"). For example, card readers 382A may include optical or magnetic readers to scan player loyalty cards of players, thereby allowing the user to identify themselves to kiosk service robot 300 by scanning or swiping their card. Card readers 382A may include magnetic or chip readers to scan payment cards (e.g., credit or debit cards, reward cards), thereby allowing the user to conduct payment card transactions via kiosk service robot 300 (e.g., food/beverage purchases, hotel check-in or check-out, event ticket purchases, gaming transactions, or the like). Ticket readers 382B may include optical scanners configured to, for example, accept, read an optical image from, and retain TITO tickets (e.g., in an internal, secured ticket collector), thereby allowing the user to, for example, provide funds for wager gaming at kiosk service robot 300 via a valid TITO ticket, deposit funds into their personal accounts via a valid TITO ticket, or redeem reward tickets issued through the TITO system. In some embodiments, the card readers 382A may be configured to scan or read and extract information from driver's licenses of patrons (e.g., optical code, mag stripe, optical character recognition ("OCR") of a digital image). Card readers 382A may include radio-frequency identification ("RFID") readers configured to, for example, read RFID tags from hotel key cards or other devices.

In some embodiments, kiosk service robot 300 may be configured to transact with users via contactless payment. For example, kiosk service robot 300 may include an RFID or NFC receiver (e.g., antenna, as card readers 382A or ticket readers 382B) positioned near a surface of kiosk service robot 300, which may be identified by a visible symbol or lighting that identifies where the user is able to position the contactless payment device (user device, e.g., smart phone, mobile gaming device 256 shown in FIG. 2B, chipped payment card, or the like) during a contactless payment transaction. Kiosk service robot 300 may provide lighting or display a symbol or other indicia indicating when kiosk service robot 300 has activated readers 382 to accept a contactless payment. Kiosk service robot 300 may additionally or alternatively provide a change in lighting to indicate when kiosk service robot 300 has effectively communicated with the contactless payment device and completed acquiring the payment information or completed the transaction. The contactless payment device may include a digital wallet or other contactless payment application and associated devices to enable wireless communication with or by kiosk service robot 300 and the user device. Kiosk service robot 300 may allow users to complete payment transactions via contactless payment for various goods or services described herein, such as, for example, purchasing food or beverages (e.g., from a bar or restaurant provided at the venue, for immediate acquisition of food or beverages contained within kiosk service robot 300, or the like), purchasing show tickets, purchasing lodging or parking accommodations (e.g., hotel charges, valet charges), tipping staff, or other goods or services offered by the venue. In some embodiments, kiosk service robot 300 may provide various kiosk services and may allow contactless transactions for such services. For example, a player seated at a gaming device, a gaming table, or otherwise within the gaming venue, may interact with kiosk service robot 300 to acquire gaming credit (e.g., TITO ticket, gaming chips). Kiosk service robot 300 may allow contactless payment from the player via their user device for a particular credit amount, and kiosk service robot 300 may then provide the credit amount to the player via generating and printing a TITO ticket (e.g., via an embedded ticket printers 384B) or dispensing the credit amount in chips (e.g., from an internal chip reservoir to a chip dispenser slot, neither shown, or through a task to fetch and deliver the credited amount in chips from a cashier cage or kiosk to the player).

In some embodiments, kiosk service robot 300 may be configured to include a card printer 384A or a ticket printer 384B (collectively, "printers 384"). For example, card printer 384A may be configured to print and issue player loyalty cards to new or existing loyalty account holders. Card printer 384A may be configured to issue hotel key cards for guests of a related hotel property. Ticket printer 384B may include a TITO ticket printer, such as ticket printer 222 (shown in FIG. 2A). As such, kiosk service robot 300 may be configured to issue TITO tickets, for example, after a gaming session at kiosk service robot 300, as a kiosk withdrawal transaction, during a reward redemption, or the like. In some embodiments, kiosk service robot 300 may include other types of printers, for example, laser printers or ink jet printers configured to print on sheet paper (e.g., 8.5×11-inch sheets), on roll paper (e.g., for printing of sales transaction receipts), or particular venue tickets (e.g., for printing show tickets or the like). In some embodiments, kiosk service robot 300 may be configured with one or more magnetic, optical scanner devices or chip readers (not separately shown). Such scanner devices may be configured to read data from, for example, loyalty cards, payment cards, rewards vouchers, hotel key cards, coupon vouchers, or the like.

In some embodiments, kiosk service robot 300 may include an inertial measurement unit ("IMU") 396 that is configured to measure aspects of movement data such as force, angular rate, linear acceleration, or orientation of kiosk service robot 300. IMU 396 may include, for example, one or more accelerometers, magnetometers, gyroscopes (e.g., microelectromechanical systems "MEMS") gyroscope), or any combination thereof. In some embodiments, IMU 396 includes any or all of an accelerometer, a magnetometer, and a gyroscope for any or all of three potential axes of motion. Such data may be used by kiosk service robot 300 as part of a navigation system to determine, for example, velocity of kiosk service robot 300, position of kiosk service robot 300, or to detect malfunction, impact to, or tipping of kiosk service robot 300. In some embodiments, IMU 396 may include a tilt sensor to detect tilting of kiosk service robot 300 (e.g., beyond a pre-determined operational threshold).

In some embodiments, kiosk service robot 300 includes one or more sensors 395. For example, sensors 395 may include collision detection (or "impact") sensors. Impact sensors may be used by kiosk service robot 300 to detect collisions between kiosk service robot 300 and other stationary or moving objects as kiosk service robot 300 moves through the operations venue or to detect other impacts to kiosk service robot 300. Example impact sensors may include, for example, push button switches, limit switches, tactile bumper switches. Upon detection of physical contact with another object while moving, kiosk service robot 300 may be configured to stop moving, perform rerouting, slow movement speed, perform proximity sensing or object detection, or such similar actions to enhance operational safety of kiosk service robot 300. In some embodiments, touch sensors may be configured to detect touch events on surfaces of kiosk service robot 300, thereby allowing kiosk service robot 300 to detect when a patron has touched kiosk service robot 300 and, for example, stop movement, turn attention to the direction of the touch, greet the patron, or the like.

In the example embodiment, sensors 395 may also include an array of one or more proximity sensors. Such proximity sensors may include, for example, ultrasonic range sensors, infrared ("IR") range sensor, laser range sensors, or light detection and ranging (LiDAR) sensors. In some embodiments, though not separately shown, the proximity sensors may include encoders, stereo cameras, or 3D depth cameras to provide depth information (e.g., distance sensing) with objects near kiosk service robot 300. The proximity sensors may be used by the navigation system of kiosk service robot 300 to perform object detection and obstacle avoidance as kiosk service robot 300 plans or executes movement actions within the operations venue. In some embodiments, the proximity sensors may be provided around a pre-designated front and forward-facing sides of kiosk service robot 300 based on a pre-defined direction of movement of kiosk service robot 300 (e.g., to detect static or moving objects ahead of or within the movement path of kiosk service robot 300, to detect potential intersecting paths with moving objects on the sides of kiosk service robot 300). In some embodiments, the proximity sensors may be provided around all sides of kiosk service robot 300, thereby allowing proximity detection and range detection through 360 degrees of operation. In some embodiments, the proximity sensors include camera devices 380 for visual object recognition. In some embodiments, inputs from multiple camera devices 380 may be used to determine depth information, or distance from kiosk service robot 300 to nearby objects.

In some embodiments, sensors 395 may also include one or more positioning sensors that are used to acquire sensor-based location information and perform sensor-based position determination of kiosk service robot 300 within the operations venue. For example, kiosk service robot 300 may perform trilateration or multilateration of wireless signals (e.g., Bluetooth, Wi-fi) to enable the robot management system server 207 or kiosk service robot 300 itself to determine a location of the robot within the operations venue (e.g., global positioning system ("GPS") or various indoor positioning systems). Kiosk service robot 300, in some embodiments, may include a receiver that is configured to receive signals from multiple transmitters placed in fixed indoor locations throughout the operations venue, using time of arrival ("ToA") of the signals from the various transmitters to determine location of kiosk service robot 300 (e.g., based on propagation time). In another embodiment, kiosk service robot 300 uses ultra-wideband ("UWB") indoor positioning to determine the position of kiosk service robot 300. The operations venue may be configured with multiple reference points that similarly use ToA, angle of arrival ("AoA"), time difference of arrival ("TDoA"), received signal strength ("RSS"), or a hybrid of such approaches to compute position estimations between the transmitters and receivers. In some embodiments, the operations venue may be configured with ultrasonic audio transmitters or receivers that can be used in conjunction with complementary ultrasonic receivers or transmitters on kiosk service robot 300 for location determination. In some embodiments, various outputs from camera devices 380 may be used for position determination and, as such, may act as the positioning sensors. In some embodiments, kiosk service robot 300 may use the positioning sensors for landmark detection (e.g., identifying pre-defined landmarks statically positioned within the operational venue and having known positions and, by proxy, thus providing positioning information about kiosk service robot 300). In example embodiments, kiosk service robot 300 may use multiple types of position sensors (e.g., using sonar-based, Light Detection and Ranging (LiDAR) based sensors, near-infrared ("NIR") sensors, infrared ("IR") sensors, gyroscopic sensors, and/or laser sensors) concurrently. Use of multiple different types of position sensors may provide technical benefits such as redundancy, more refined positioning, more reliable detection of obstructions, and such.

In some embodiments, kiosk service robot 300 may use sensor-based position determination in conjunction with camera input data to refine an estimated position of kiosk service robot 300 within the operations venue. For example, the robot management system may provide a position estimate of kiosk service robot 300 based on the sensor-based position data to give kiosk service robot 300 an approximate location on a map of the operations venue. Based on that approximate location, kiosk service robot 300 may capture digital camera data (e.g., digital images, 3D depth information, laser scanning) or proximity data from the proximity sensors to determine more accurate location based on known static objects or surfaces near that approximate location. In some embodiments, kiosk service robot 300 may use dead reckoning techniques from a known starting location to determine an approximate location and may similarly refine that approximate location with proximity data or camera data.

In some embodiments, kiosk service robot 300 may include an exterior lighting system 394 that is configured to provide lighting on or around kiosk service robot 300. The exterior lighting system 394 may be used to, for example, improve visibility of kiosk service robot 300 to patrons standing or walking around the operations venue, or to provide additional illumination for escorted guests or for capturing clearer camera data.

Figure 4:
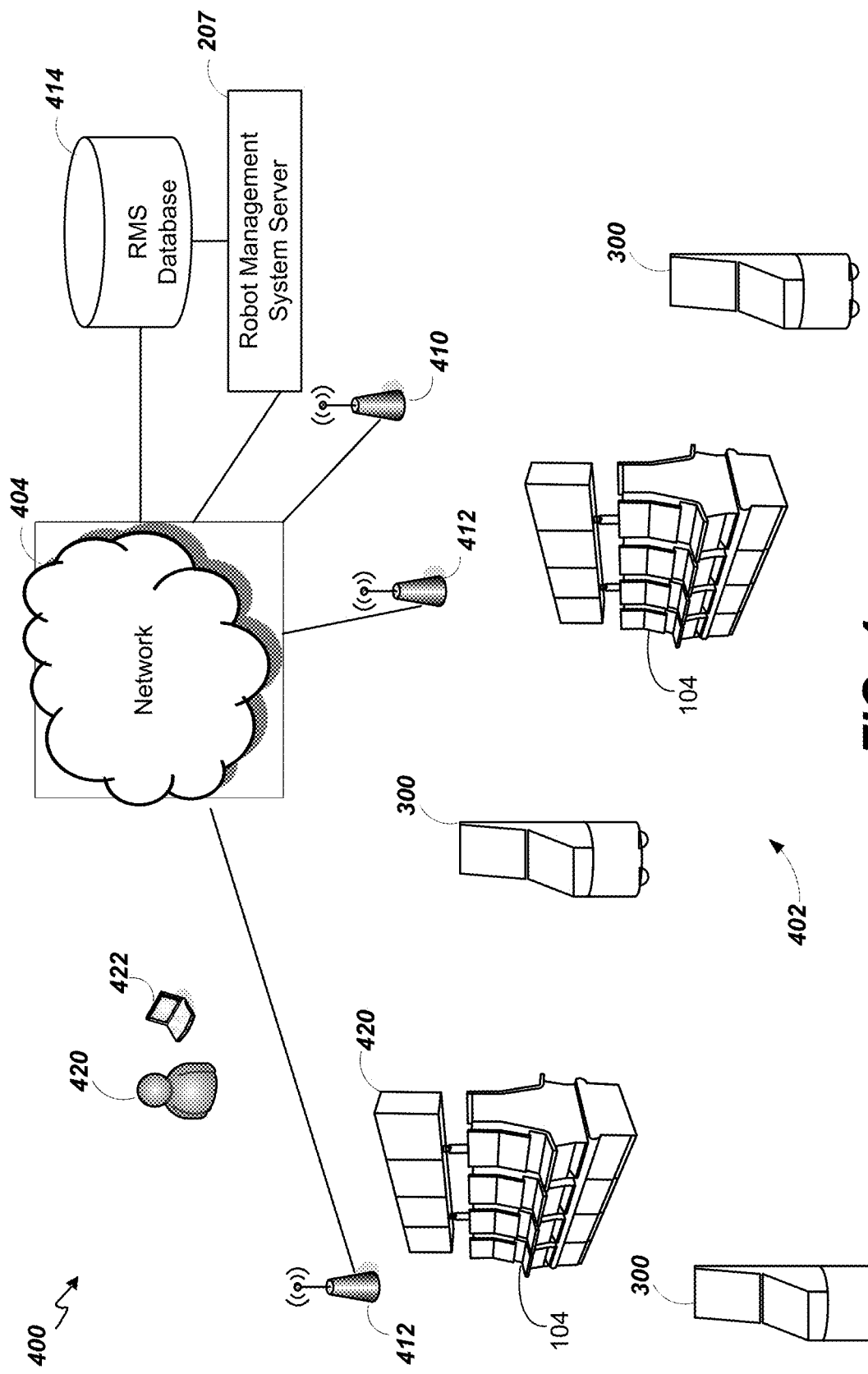
FIG. 4 is a diagram of an example networked environment for a robot management system.

FIG. 4 is a diagram of an example networked environment for a robot management system. In the example embodiment, the robot management system server 207 manages the fleet of kiosk service robot 300. Kiosk service robot 300 operate within and move around an operations venue (or just "venue") 402 (e.g., a casino or other gaming establishment, which may be similar to the casino 251 (shown in FIG. 2B)), and may perform various directed, semi-autonomous, or autonomous operations, either alone or in conjunction with the robot management system server 207, other kiosk service robot 302640 within the venue 402, or an operator 420 of the robot management system 400. The operations venue 402 includes numerous obstacles to the movement of kiosk service robot 300. Such obstacles include static inanimate objects that are typically placed in a location and not regularly moved. Static inanimate objects may include, for example, gaming devices 104, gaming tables, and the like. The venue also includes various movable inanimate objects, such as chairs, pedestals, planters, floor signage, and other objects too numerous to name (and are not shown here for purposes of brevity). Such movable inanimate objects are more easily relocatable and may be regularly relocated (e.g., by players or service personnel). The venue 402 also includes structural obstacles, such as walls, pillars, stairs, escalators, ramps, and other surfaces that may not be traversable by kiosk service robot 300. Further, during normal use, the venue 402 also may include animate objects that present obstacles to movement of kiosk service robot 300, such as people (e.g., players, patrons, service personnel, and the like), animals (e.g., pets), and other kiosk service robot 300, all of which may be present within and move about the venue 402.

Kiosk service robot 300 communicate wirelessly with the robot management system server 207 and other networked devices via a network 404. The network 404 provides one or more wireless access points 410 that allow kiosk service robot 300 to wirelessly connect to the network 404 to transmit and receive data. The network 404 may be similar to the network 214 or may otherwise have connectivity to any of the system servers shown in FIG. 2A. In some embodiments, kiosk service robot 300 or the robot management system server 207 may communicate with other system servers during various tasks, such as the TITO system server 108 (e.g., when issuing or redeeming TITO ticket), the player tracking system server 110 (e.g., when identifying or authenticating loyalty members), or the progressive system server 112 (e.g., when performing a hand pay-out of a progressive jackpot) shown in FIG. 1.

In the example embodiment, the venue 402 includes multiple wireless indoor positioning transmitters (or just "transmitters") 412. Such transmitters 412 may be installed within the venue 402 and arranged throughout the venue 402 such as to allow adequate positioning coverage (e.g., trilateration or multilateration) to kiosk service robot 300 in all areas where kiosk service robot 300 are expected to move and operate. For example, in some embodiments, kiosk service robot 300 use distance signals from at least three transmitters 412 to triangulate a position estimate of kiosk service robot 300.

In the example embodiment, the robot management system 400 includes a robot management system ("RMS") database 414. The RMS database 414 may be used for various robot management operations. For example, the RMS database 414 may include one or more static maps of the venue 402 and may share these maps with kiosk service robot 300. Static maps are digital representations (e.g., models) of the physical venue 402, identifying locations of various static inanimate objects or structural objects within the venue (e.g., gaming devices, gaming tables, walls, and the like). In some embodiments, the static maps may include user-identified areas of operation (e.g., floor space in the venue where kiosk service robot 300 may move) and may further refine those areas of operation by inclusion of blocked areas or barriers (e.g., boundaries or virtual exclusion areas where kiosk service robot 300 may not move, such as stairs down/up between gaming areas) as well as occupied space areas (e.g., areas in which static objects are known to exist, such as known locations of gaming devices, gaming tables, and perimeters around such devices). In some embodiments, the RMS database 414 may store real-time object detection data collected from kiosk service robot 300. For example, during operation, kiosk service robot 300 may detect obstacles within the venue 402 that are not represented on the static maps (e.g., movable objects such as chairs, signs, or people, as detected via camera inputs, sensor inputs, or the like). Such data may be used as an overlay to the static maps to, for example, predict potential obstacles in certain areas. In some embodiments, the robot management system 400 may generate a heat map overlay for the venue 402. The heat map overlay indicates areas in which people often congregate or travel, using historical data, or are currently congregating or traveling using real-time data. Such data may be collected by kiosk service robot 300 or may be captured by thermal cameras deployed within the venue 402. Such data may be used during travel planning for kiosk service robot 300 (e.g., to avoid areas that may be congested with people). Further to this example embodiment, the RMS database 414 can generate an overlay map of the current position of kiosk service robot 300 showing their operating status, e.g., idle, recharging, en-route, on task, etc., and other information related to their operating status or a task they may be performing, e.g., the identification of a patron they may be assisting, a destination to which they may be heading, or an event for which they may be providing a service. In some embodiments, the RMS database 414 contains a listing of kiosk service robot 300 priorities and tasks, etc.

In an implementation, the robot management system 400 includes a robot management system terminal (or just "terminal") 422, in communication with the RMS server 207. The terminal 422 may be a stationary device, e.g., located in a venue back-office, located behind a bar, or a kiosk located on the venue floor, or may be a mobile device, e.g., a tablet computer, laptop, smart phone, etc. The RMS terminal 422 is configured for an operator 420 (e.g., administrator, technician, service staff) to perform various administrative functionality for the fleet of kiosk service robot 300, such as accessing the RMS database 414 and, e.g., view the various maps and any other information contained in the RMS database 414. In an example, the terminal 422 is configured to allow the operator 420 to, using an input device operatively connected to the terminal 422 such as, e.g., a mouse or touchscreen, select a kiosk service robot 300 and view detailed information pertaining to the selected robot 300, e.g., via a pop-up window appearing on the terminal display. In the example embodiment, the RMS terminal 422 provides an RMS GUI through which the operator 420 administers the fleet. Various administrative operations and tasks performed by the operator 420 and the RMS server 207 are described in greater detail below.

In an example, the operator 420 can 'take control' of the selected kiosk service robot 300. As an example, the terminal 422 displays a list of destinations for the robot to travel, e.g., a venue location or the location of a VIP player, and the operator 420 can select one of those destinations and, e.g., a task for kiosk service robot 300 to perform when it arrives at that location. In an example, the terminal 422 RMS GUI allows the operator 420 to 'drive' kiosk service robot 300, e.g., providing a 'joystick' or other user interface device that enables the operator 420 to change the kiosk service robot's 300 rate of speed and direction, operate functions of kiosk service robot 300 such as, e.g., opening a storage compartment, printing a test ticket or a promotional voucher or communicate a greeting to a patron. In some examples, the terminal enables the operator 420 to directly communicate with a patron. As an example, the terminal 422 is configured with a camera device 380, microphone 356 and speakers 354 enabling the operator 420 to engage in an audio/video interaction session (e.g., "facetime") with the patron, displaying real-time video of the operator 420 on kiosk service robot 300 display while communicating directly with the patron using the camera device 380, microphone 356 and speakers 354.

In an example, the RMS terminal 422 provides an interface allowing the operator 420 to implement a robot scheduler, providing the operator 420 the ability to prioritize the actions and tasks of kiosk service robot 300, and the scheduling of those actions and tasks including, e.g., how and when they will come off-line for batteries 372 recharge or exchange. As an example, each kiosk service robot 300 is assigned a set of actions and tasks to perform during a first ("active") period and assigned a recharge period. In an example venue with a plurality of operational kiosk service robot 300, kiosk service robot 300 have alternating active periods and recharge periods. As an example, a venue has six operational robots and two recharging stations. The robot scheduler is implemented by the operator 420, using the terminal 422 RMS GUI, to schedule the active and battery recharge periods for kiosk service robot 300 to enable four of kiosk service robot 300 to be active, e.g., performing tasks, while two of kiosk service robot 300 are recharging.

In this example, as one kiosk service robot 300 begins a recharging period a second kiosk service robot 300 begins a first portion of an active period and a third kiosk service robot 300 begins a second portion of an active period. This example allows four of the six kiosk service robot 300 to be operational on the venue floor, while the other two kiosk service robot 300 are recharging. As an example, a venue may have two operational kiosk service robot 300 each with two batteries 372, and two battery charging and exchange stations. The robot scheduler is implemented by the operator 420 to schedule each of kiosk service robot 300 to perform actions and tasks and to periodically, on a predetermined schedule or on a triggering event (e.g., a robot battery low signal), travel to a battery charging and exchange station to exchange the low-charge robot batteries 372 with re-charged batteries 372.

In an example, the robot scheduler is implemented by the operator 420 to create a running task list assigned to a plurality of kiosk service robot 300. In an example, each kiosk service robot 300 as they became available would request or be assigned a next task from the running task list based, e.g., of the capabilities of the robot and the proximity of kiosk service robot 300 to the task location of the venue. In an example, a task on the running task list assigned to a first kiosk service robot 300 can be performed by a second kiosk service robot 300 as, e.g., the second kiosk service robot 300 happened to be available and in the area of the venue task location. Further to this example, the robot management system 400 keeps track of the location of the robots in the venue and referencing the running task list and known capabilities of each robot, dynamically assigns a task to an available kiosk service robot 300, e.g., based on the capabilities and current location of kiosk service robot 300. In another example, the robot management system broadcasts an open task, e.g., from the running task list to kiosk service robot 300 and any available kiosk service robot 300 capable of performing the task responds with their location information allowing the robot management system 400 to assign the task to, e.g., a kiosk service robot 300 capable of performing the task and in proximity of the location of the task.

In some embodiments, the venue 402 includes a gantry system mounted to the ceiling of the venue 402, upon which kiosk service robots 300 may be suspended and can be moved throughout the venue 402. Such suspended kiosk service robot 300 may be raised when traveling between locations, thereby avoiding some obstacles, and may be lowered when arriving at a particular destination to provide various configured services.

Figure 5A:
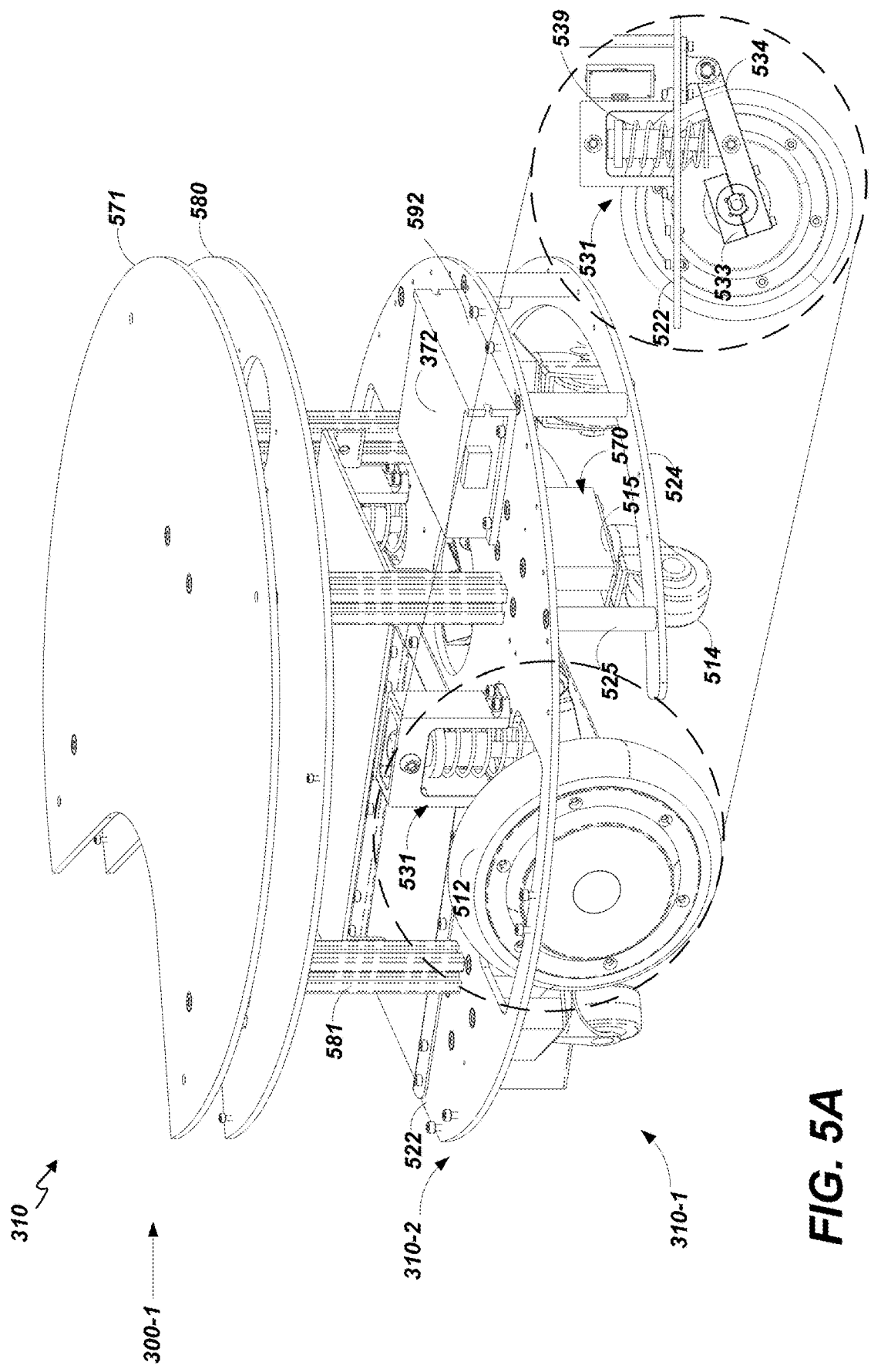
FIG. 5A illustrates an example base unit of the kiosk service robot in accordance with various embodiments described herein.

As illustrated with regard to FIG. 3A, to reduce the potential for tipping, the kiosk service robot 300 may include a specially designed base unit (e.g., the base unit 310). For example, FIG. 5A illustrates an example of the base unit 310 of the kiosk service robot 300 in accordance with various embodiments described herein. It is to be understood that for better illustration of the inside components, the enclosure (e.g., the housing 317) of the base unit 310 is not shown in FIG. 5A.

As illustrated in FIG. 5A, the base unit 310 may include the two drive wheels 512 (only one is shown in FIG. 5A) disposed on a first side of the base unit 310-1 (e.g., the bottom side), each being independently drivable. For example, each of the drive wheels 512 may include a corresponding hub motor (not shown, but integrated into the wheel hub) configured to drive the corresponding wheel. Each of the drive wheels 512 may be supported relative to the base unit 310 by a corresponding suspension element 531 that may allow the supported drive wheel 512 a limited amount of up/down movement to ensure a smoother ride and reduce some the potential for tipping during normal operation. In some embodiments, the suspension element 531 may include a swing arm 534 that is connected to a pivot of the corresponding drive wheel 512 through a pillow block 533. In some embodiments, the suspension element 531 may include a shock absorber 539 (e.g., a coil spring) that passes through a bottom plate 522 (discussed in detail below). For example, the first end of the shock absorber 539 (e.g., an upper end) may be disposed on one side of the bottom plate 522 (e.g., an upper side) and the second end of the shock absorber 539 (e.g., a lower end) may be on the other side of the bottom plate 522, opposite the first side (e.g., a lower side). In some embodiments, the second end of the shock absorber 539 may be connected to the swing arm 534 to allow the swing arm 534 a limited amount of damped, up/down movement to allow the base unit 310 to traverse over minor bumps or gaps while traveling without the base unit 310 needing to undergo the same amount of displacement as the drive wheels 512 (this allows the drive wheels 512 to also maintain contact with the ground).

Figure 5B:
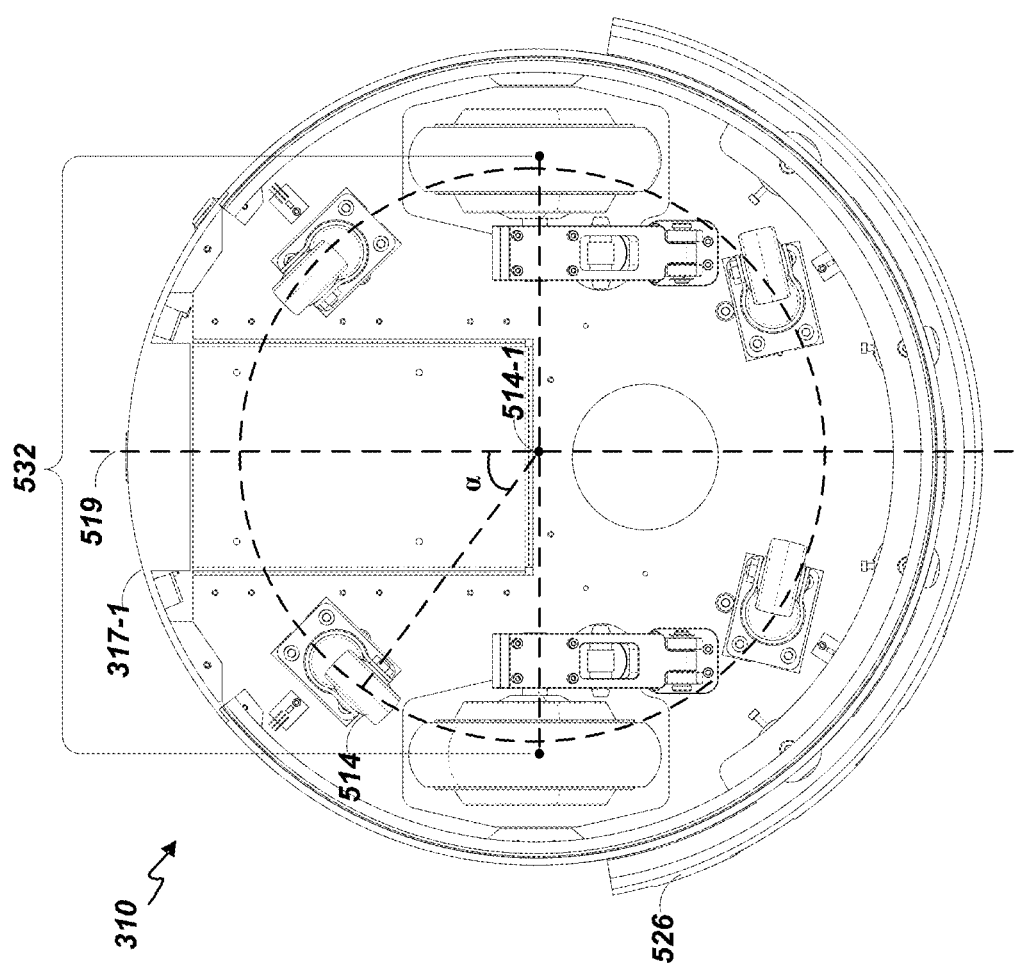
FIG. 5B illustrates a bottom view of the example base unit in accordance with various embodiments described herein.

In some embodiments, a track of drive wheels 532 may be chosen to be small enough that the footprint of the kiosk service robot 300 would not take up more space than a normal human being does. At the same time, the track of drive wheels 532 may generally be set to be as large as possible to maximize anti-tipping as stated above. For example, FIG. 5B illustrates a bottom view of the example base unit 310 in accordance with various embodiments described herein. As illustrated in FIG. 5B, the track of drive wheels 532 may be between 14" and 18" (e.g., between about 15" to 17", such as 16") to achieve the above-mentioned effects.

The base unit 310 may also include a plurality of casters 514 (e.g., swivel casters) disposed on the first side 310-1 of the base unit 310 to provide better support of the kiosk service robot 300. For example, the plurality of casters 514 may be arranged such that each caster of the plurality of casters 514 (or the swivel axis of such casters if they are swivel casters) is radially offset from a track center 514-1 of the plurality of the casters 514 by a distance of between 7" and 9" (e.g., between about 7.5" to 8.5", such as 7.5", 7.7", 7.9", or 8.1" from a track center). For example, as illustrated in FIG. 5B, each caster of the plurality of casters 514 is radially offset from a track center 514-1 of the plurality of casters 514 by a distance of approximately 7.25". To reduce some the potential for tipping, in some embodiments, the four casters of the casters 514 may be spread out in a substantially even manner about a circumference of a circle centered on the track center 514-1 of the plurality of the casters 514. For example, each caster may be disposed in an angular zone of 30° or less within the middle of each quadrant of the circle centered on the track center 514-1 (with the boundaries between quadrants being parallel and perpendicular to the wheel track). For example, if each quadrant has an included angle of 90°, then the caster of each quadrant may be located such that $30° \leq \alpha \leq 60°$.

In some embodiments, each caster of the plurality of casters 514 may be connected to the base unit 310 (e.g., through a bottom plate 522, which will be discussed in detail below) through a mounting element 570 that prevents vertical movement of that caster relative to the bottom plate 522. In some embodiments, the plurality of casters 514 may include four casters, wherein each caster is connected to the bottom plate 522 through two corresponding rectangular blocks 515 (e.g., the mounting element 570 may include two rectangular blocks 515).

In some embodiments, as noted above, the base unit 310 may include a housing 317 configured to provide the exterior surface 310-3 of the base unit 310. For example, FIG. 5C illustrates an example housing 317 of the base unit 310 in accordance with various embodiments described herein. In some embodiments, as noted above, the housing 317 may be sized so as to be circumscribed by a cylindrical reference volume having a diameter of between 16" and 24" (e.g., between about 20" and 23", such as 21", or 22"). In some embodiments, one or more sensors 595 (e.g., the sensors 395 shown in FIG. 3B) configured to detect obstacles blocking a trajectory of the kiosk service robot 300 within a predetermined range (e.g., 0.2 m, 0.5 m, 1 m, 1.5 m) of a portion of the kiosk service robot 300 (e.g., the base unit 310) may be enclosed by the housing 317. As noted above, the one or more sensors may include sonar-based sensors, a LiDAR sensor, near-infrared ("NIR") sensors, infrared ("IR") sensors, gyroscopic sensors (to determine changes in heading or orientation), and/or laser sensors (to measure distance). In some embodiments, the housing 317 may include one or more sensor windows 536 where each sensor window 536 corresponds to one of the sensors 595. Each sensor window may be transmissive, e.g., to light or ultrasonic signals, to allow such signals to pass through the sensor window and be detected by the corresponding sensors 595. For example, the sensor window 536 that corresponds to a sonar sensor may be transmissive to the ultrasonic signals emitted by the sonar sensor.

In some embodiments, the base unit 310 may include the bottom plate 522 positioned within housing 317. For example, FIG. 5D illustrates an example bottom plate 522 of the kiosk service robot 300 in accordance with various embodiments described herein. In some embodiments, the bottom plate 522 may include two wheel openings 523, each of which corresponds in location to one of the drive wheels 512. For example, each wheel opening 523 may have a cross-sectional shape that generally matches (but is scaled somewhat larger than) a cross-sectional shape of the corresponding drive wheel 512, thereby allowing the corresponding drive wheel 512 to pass therethrough when undergoing suspension travel. In some embodiments, each wheel opening 523 may have a substantially rectangular shape having chamfered edges on each of the four corners, e.g., an octagonal cross-section 509 in which the octagon has a dimension in a direction parallel to the wheel rotational axes that is significantly shorter than the dimension of the octagon in the orthogonal direction, e.g., having a ~1:1.8 aspect ratio). In some embodiments, each wheel opening 523 may also include a round or semi-obround cutout 511 along on an inner edge (e.g., an edge closer to a center of the bottom plate 522) that is configured to allow the shock absorber to pass therethrough. In some embodiments, the bottom plate 522 may also include a circular hole 529, e.g., a 100 mm diameter hole, generally disposed at the center of the bottom plate 522 and configured to allow cables (e.g., for power and/or control signal transmission) to pass therethrough.

In some embodiments, the bottom plate 522 may further include a cutout 527 connected with a battery tray 592 (shown in FIG. 5A) that is configured to support the batteries 372 (shown in FIG. 5A) from below. In some embodiments, the cutout 527 may be sized to receive the batteries 372 and may have a lower surface that is at the same level as a lower edge of the housing 317. In some embodiments, the cutout 527 may be rectangular and may extend to an outer edge 522-1 of the bottom plate 522 and to or almost to the center of the bottom plate 522.

Referring back to FIG. 5A, in some embodiments, the base unit 310 may include a C-shaped plate 524 disposed along an interior edge 317-1 of the housing 317 (shown in FIG. 5B). For example, the C-shaped plate 524 may be vertically offset downward from the bottom plate 522 by a plurality of vertical standoffs 525. In some embodiments, the base unit 310 may include a bumper 526 (shown in FIG. 5B) connected to the base unit 310 via the vertical standoffs 525. With regard to the description of FIG. 3B, the bumper 526 may be functionally connected to impact sensors of the sensors 395. For example, when the service kiosk robot 300 comes into physical contact with an external object, the bumper 526 may move inward to the base unit 310 and may eventually push a push button switch of the impact sensors. When the impact sensors close its circuit, an electrical signal may be transmitted through a harness and may provide a signal to the controller. The controller may then determine if the service kiosk robot 300 should slow, stop, or change directions based on the signal received from the sensors. In some embodiments, the controller may control the movement of the service kiosk robot 300 by transmitting one or more control messages to the drive wheels 512.

Figure 5E:
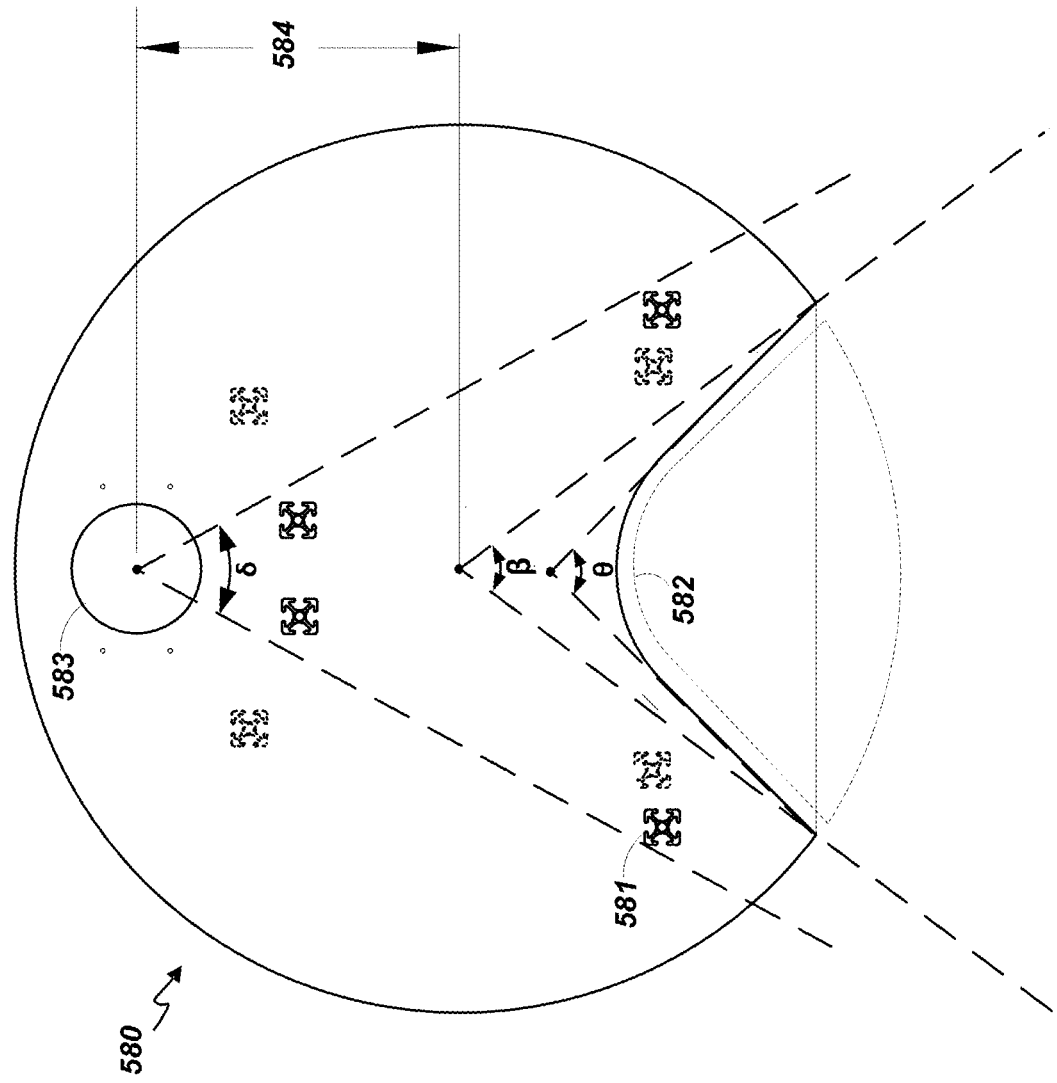
FIG. 5E illustrates an example middle plate of the kiosk service robot in accordance with various embodiments described herein.

The base unit 310 may also include a top plate 571 and a middle plate 580. For example, FIG. 5E illustrates an example middle plate 580 of the kiosk service robot 300 in accordance with various embodiments described herein. As shown in FIG. 5E, the middle plate 580 may connect to the bottom plate 522 and the top plate 571 through one or more columns 581 (also shown in FIG. 5A); columns 581 that connect the top plate to the middle plate are shown in solid outline, while columns that connect the bottom plate to the middle plate are shown in dotted outlines. In some embodiments, the middle plate 580 may have a substantially circular shape having a cutout 582 for the harness (e.g., configured for transmitting electrical signals and/or electrical power between components in the base unit and the superstructure) to pass through. In some embodiments, an angle θ formed by the two edges of the cutout 382 may be about 90°. A central angle β of the cutout 582 may be between about 70° and 80°, e.g., 74°, 75°, or 76°. In some embodiments, the cutout 382 may have a rounded internal corner of about 4" radius.

The middle plate 580 may also include a cutout 583 configured to accommodate a sensor 395 (e.g., the LiDAR sensor). The cutout 583 may have a cross-sectional shape that generally matches (but is scaled somewhat larger than) a cross-sectional shape of the corresponding LiDAR sensor, thereby allowing the LiDAR sensor to be placed inside. In some embodiments, the cutout 583 may have a substantially circular shape. A distance 384 between a center of the cutout 383 and the center of the middle plate 580 may be between about 7.5" to 8" (e.g., about 7.8").

In some embodiments, when assembled (e.g., with the LiDAR sensor placed in the cutout 583), such an arrangement may allow the LiDAR sensor to have about 300° of its total rotational travel unobstructed by columns or other structures. In other words, internal components of the kiosk service robot 300 that are disposed in between the middle plate 580 and the top plate 572 (e.g., the one or more columns 581 and/or the harness passing through the cutout 582) may be disposed within about an angular zone of about 60° (e.g., about 60° of the rotation angle of the LiDAR sensor, where δ≅60°).

Figure 5F:
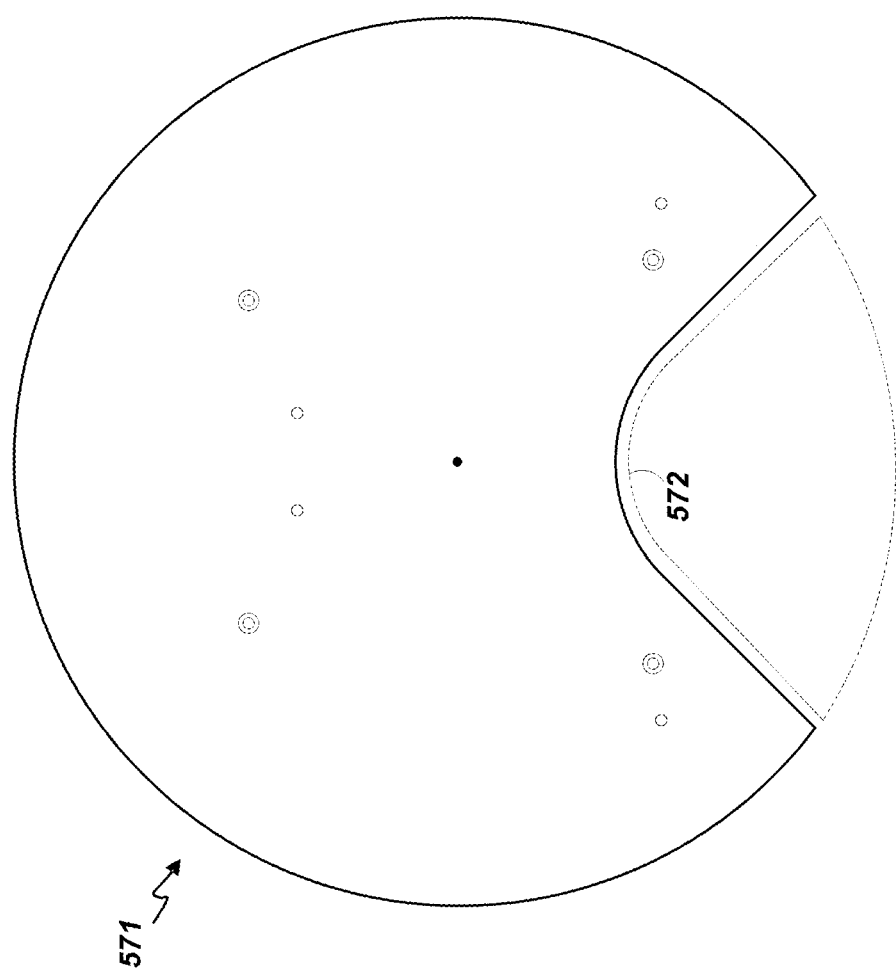
FIG. 5F illustrates an example top plate of the kiosk service robot in accordance with various embodiments described herein.

FIG. 5F illustrates an example top plate 571 of the kiosk service robot 300 in accordance with various embodiments described herein. In some embodiments, the top plate 571 may have a shape that generally matches the shape of the middle plate 580 (e.g., having a cutout 572 similar and corresponding to the cutout 582 of the middle plate 580, and is configured for the above-mentioned harness to pass through). The top plate 571 may connect to the middle plate 580 through the one or more columns 581. The top plate and the middle plate may form a generally featureless set of parallel surfaces within the 300° of arc discussed earlier, thereby providing a space through which the LiDAR sensor beam may sweep without potentially reflecting off of objects located in between the two plates (thus reducing the potential for sensing artifacts). The bottom plate, the middle plate, and the top plate may, for example, all be the same nominal diameter, e.g., about 22".

Figure 6:
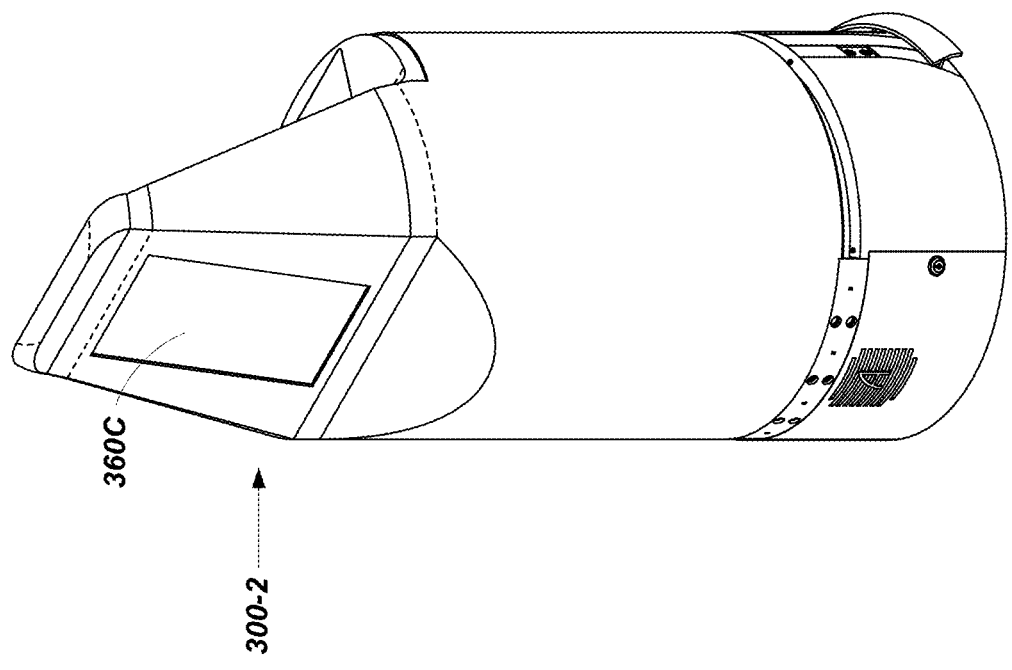
FIG. 6 illustrates example displays of the kiosk service robot in accordance with various embodiments described herein.
Figure 6:
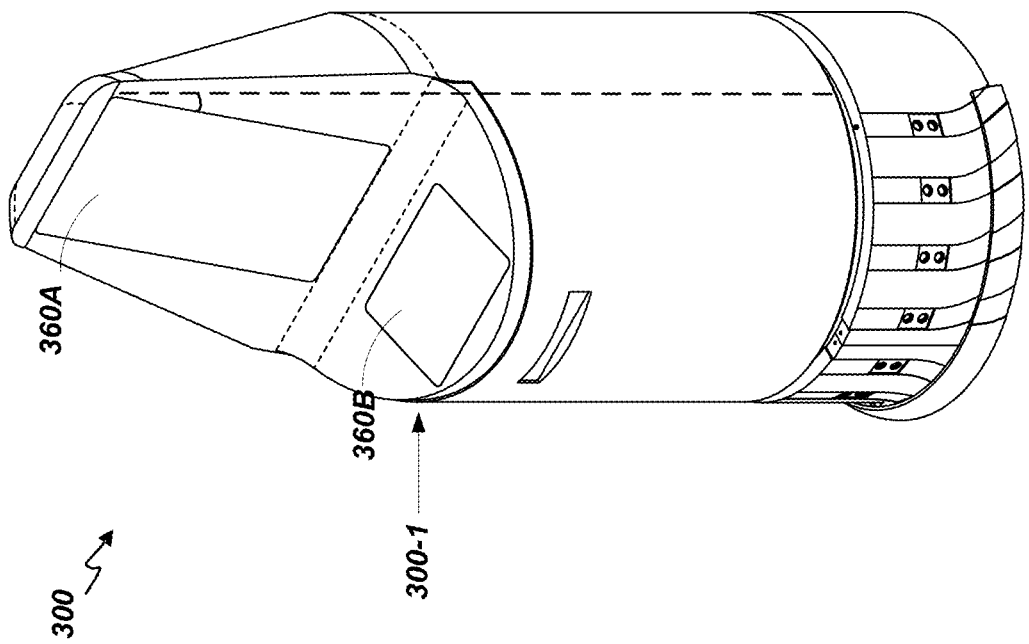

FIG. 6 illustrates example displays 360 of the kiosk service robot 300 in accordance with various embodiments described herein. As noted above, the displays 360 may include a primary display (e.g., the first display 360A), a service display (e.g., the second display 360B), and a secondary display (e.g., the third display 360C), controlled by one or more controllers (e.g., the processors 390 shown in FIG. 3B). As illustrated in FIG. 6, in some embodiments, the primary and service displays (e.g., the first and second displays 360A and 360B) may be located on a front side of the kiosk service robot 300-1 (e.g., facing the user), and the third display 360C may be located on back side of the kiosk service robot 300-2, opposite the front side of the kiosk service robot 300-1. In some embodiments, one or more of displays 360 (e.g., the first display 360A) may be configured to display touch-input controls (e.g., interactive GUIs). For example, one or more of displays 360 may provide graphical output to users (e.g., players, service technicians, operators) during operation.

To reduce the potential for such user interactions inadvertently causing the kiosk service robot to tip over, some kiosk service robots may be configured to cause the touch-input control or controls to be presented only on a lower portion of the first display and no touch-input controls to be presented on an upper portion of the first display. For example, the first display 360A may be configured (e.g., caused by the controller of the kiosk service robots 300) such that no touch-input controls may be displayed on upper third of the first display 360A, upper half of the first display 360A, upper two-thirds of the first display 360A, etc. For example, the controller may be configured to cause one or more touch-input controls to be displayed on the primary display (e.g., first display 360A) at a distance from 39" to 51" (e.g., at about lower two-thirds of the first display 360A), from 39" to 48" (e.g., at about lower half of the first display 360A), or from 39" to 45" (e.g., at about lower one-thirds of the first display 360A) relative to portions of two drive wheels 512 that extend from housing 317 (e.g., from the floor). This discourages patrons from trying to push on the upper portion of the primary display (or at least removes a reason for them to do so), thus potentially shortening the moment arm that may be generated if a patron pushes on the first display 360A.

Figure 7:
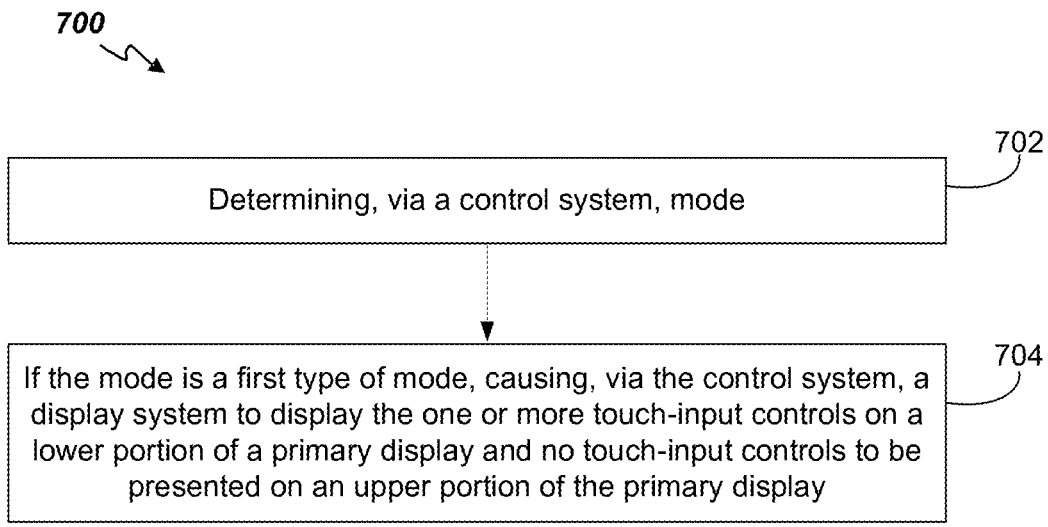
FIG. 7 is a flow diagram that shows blocks of a method according to one example.

FIG. 7 is a flow diagram that blocks of an example technique for displaying touch-input controls for a service kiosk robot. In some instances, technique 700 may be performed, at least in part, by an apparatus such as that described above with reference to FIGS. 3A, 3B, and 5A-6.

It is to be understood that the number and sequence of blocks shown in FIG. 7 are merely examples. Similar techniques may include more or fewer blocks.

According to this example, block 702 involves determining, via a control system, an operational mode of a kiosk service robot (e.g., kiosk service robot 300). For example, the control system may include one or more components described in FIG. 3B, such as non-volatile storage 359, processors 390, and/or working memory 392. As noted above, the operational modes may include a user mode where users may input instructions/controls to kiosk service robot 300 by touching the touch-input controls displayed on first display 360A and/or a maintenance/administrative mode where the technician may perform the maintain/administrative operations.

According to this example, if the mode is a first type of mode, e.g., a customer service mode, then the technique may involve, in block 704, causing, via the control system, a display system (e.g., the display 360) to display the one or more touch-input controls on a lower portion of a primary display (e.g., the first display 360-A) and no touch-input controls to be presented on an upper portion of the primary display (or, alternatively, no touch-input controls to be presented on the primary display). For example, the one or more touch-input controls may be presented only on a lower portion of first display 360-A and no touch-input controls to be presented on an upper portion of first display 360-A. For example, the controllers may be configured to cause one or more touch-input controls to be displayed on first display 360-A at a distance from 39" to 51" (e.g., at about lower two-thirds of the first display 360A), from 39" to 48" (e.g., at about lower half of the first display 360A), or from 39" to 45" (e.g., at about lower one-thirds of the first display 360A) relative to portions of two drive wheels 512 that extend from housing 317 (e.g., from the floor).

While specific examples have been described with respect to the figures, it will be appreciated that many modifications and changes may be made by those skilled in the art without departing from the scope of the present disclosure.

What is claimed is:

1. A robot comprising:
  a base unit that comprises:
    a housing sized so as to be circumscribed by a cylindrical reference volume and configured to provide an exterior surface of the base unit;
    two drive wheels disposed on a first side of the base unit, wherein each drive wheel is independently drivable;
    a first plate;
    a second plate, wherein the first plate and the second plate are arranged in a stacked, spaced-apart configuration;
    a light detection and ranging (LiDAR) sensor positioned at least partially between the first plate and the second plate, wherein a portion of the LiDAR sensor is configured to rotate about a center axis; and
    one or more structural members spanning between the first plate and the second plate, wherein the center axis of the LiDAR sensor is positioned such that the one or more structural members are positioned in a first sector bounded by two radii that are perpendicular to the center axis and that extend from the center axis and past the housing, the first sector having a 60° interior angle, and such that no structural members are located in a second sector bounded by the two radii and having an interior angle of 300°.

2. The robot of claim 1, further comprising a superstructure connected with the base unit on a second side of the base unit opposite to the first side of the base unit, wherein the superstructure is at least about five feet high.

3. The robot of claim 1, wherein the base unit further comprises a bottom plate positioned within the housing, wherein the bottom plate comprises two wheel openings, each wheel opening corresponding in location to one of the two drive wheels, wherein each wheel opening has a cross-sectional shape that is sized larger than a cross-sectional shape of the corresponding drive wheel, thereby allowing the corresponding drive wheel to pass therethrough.

4. The robot of claim 3, wherein the base unit further comprises:
  a C-shaped plate disposed along an interior edge of the housing, wherein the C-shaped plate is vertically offset downward from the bottom plate by a plurality of vertical standoffs; and
  a bumper, wherein the bumper is connected to the base unit via the vertical standoffs.

5. The robot of claim 3, wherein:
  the bottom plate further comprises a cutout, and
  the cutout is sized to receive a battery for providing power to the kiosk service robot.

6. The robot of claim 5, wherein:
  the cutout of the bottom plate is connected with a battery tray that is configured to support the battery from below and which has a lower surface that is at the same level as a lower edge of the housing.

7. The robot of claim 5, wherein the cutout of the bottom plate is rectangular and extends to an outer edge of the bottom plate.

8. The robot of claim 3, further comprising:
  a superstructure connected with the base unit on a second side of the base unit opposite to the first side of the base unit;
  a first display supported by the superstructure relative to the base unit and positioned such that a center of the first display is: a) located within the reference cylindrical volume of the housing and b) positioned between 42.5" and 52.5" away from a portion of the two drive wheels extending out of the housing; and
  a controller configured to cause one or more touch-input controls to be displayed on the first display at a distance between 39" and 51", relative to portions of the two drive wheels that extend from the housing.

9. The robot of claim 8, further comprising a second display and a third display, wherein the first and second displays are located on a front side of the robot, wherein the third display is located on a back side of the robot opposite to the front side of the robot, and wherein the first display is tilted between 10° and 20° from vertical.

10. The robot of claim 8, wherein when the controller is in a first mode, the controller is further configured to cause one or more touch-input controls to be presented only on a lower portion of the first display and no touch-input controls to be presented on an upper portion of the first display.

11. The robot of claim 3, further comprising a plurality of casters disposed on the first side of the base unit, wherein:
  the plurality of casters are arranged such that each caster of the plurality of casters are radially offset from a track center of the plurality of casters by a distance between 7" and 9", and
  each of the plurality of casters is connected to the bottom plate through a mounting element that prevents vertical movement of that caster relative to the bottom plate.

12. The robot of claim 11, wherein the plurality of casters comprise four casters, wherein each of the casters are connected to the bottom plate through two corresponding rectangular blocks.

13. The robot of claim 1, wherein each of the drive wheels includes a corresponding hub motor.

14. The robot of claim 1, further comprising a corresponding swing arm for each of the drive wheels, each swing arm supporting the corresponding drive wheel and configured such that when the swing arm pivots about a corresponding pivot point relative to the housing, a rotational axis of the corresponding drive wheel supported thereby traverses along an arcuate path, wherein the swing arms supporting the drive wheels are independently movable and, for each of the swing arms, a corresponding shock absorber is connected with that swing arm in between the corresponding pivot point for that swing arm and the rotational axis of the drive wheel supported by that swing arm.

15. The robot of claim 14, further comprising, for each of the swing arms, a corresponding shock absorber connected with that swing arm in between the corresponding pivot point for that swing arm and the rotational axis of the drive wheel supported by that swing arm.

16. The robot of claim 1, further comprising one or more sensors enclosed by the housing and configured to detect obstacles blocking a trajectory of the robot within a predetermined range of the base unit, wherein the housing comprises one or more sensor windows, each sensor window corresponding to one of the sensors.

17. The robot of claim 16, wherein the one or more sensors comprises a sonar sensor.

18. The robot of claim 11, wherein each caster of the plurality of casters is radially offset from the track center of the plurality of casters by the distance of approximately 7.25".

19. The robot of claim 1, wherein the cylindrical reference volume has a diameter of approximately 22".

20. The robot of claim 1, further comprising:
a superstructure connected with the base unit on a second side of the base unit opposite to the first side of the base unit; and
a first display supported by the superstructure relative to the base unit and positioned such that a center of the first display is: a) located within the reference cylindrical volume of the housing and b) positioned between 42.5" and 52.5" away from a portion of the two drive wheels extending out of the housing, wherein the first display is positioned such that the center of the first display is positioned approximately 47.75" away from a portion of the two drive wheels extending out of the housing.

* * * * *